(12) United States Patent
Levin et al.

(10) Patent No.: US 12,282,340 B2
(45) Date of Patent: Apr. 22, 2025

(54) COUNTER DRONE SYSTEM

(71) Applicant: Anduril Industries, Inc., Costa Mesa, CA (US)

(72) Inventors: Jason Levin, Costa Mesa, CA (US); Palmer F. Luckey, Newport Beach, CA (US); Julian Hammerstein, Murrieta, CA (US); Joseph Chen, Irvine, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

(21) Appl. No.: 18/404,684

(22) Filed: Jan. 4, 2024

(65) Prior Publication Data
US 2024/0142996 A1 May 2, 2024

Related U.S. Application Data

(63) Continuation of application No. 17/830,000, filed on Jun. 1, 2022, now Pat. No. 11,899,473, which is a
(Continued)

(51) Int. Cl.
| | |
|---|---|
| *F41H 11/02* | (2006.01) |
| *B64D 7/00* | (2006.01) |
| *G01H 9/00* | (2006.01) |
| *G01S 7/41* | (2006.01) |
| *G01S 7/48* | (2006.01) |
| *G05D 1/00* | (2006.01) |

(Continued)

(52) U.S. Cl.
CPC .................. *G05D 1/12* (2013.01); *B64D 7/00* (2013.01); *F41H 11/02* (2013.01); *G05D 1/683* (2024.01); *H04W 4/021* (2013.01); *B64U 2101/15* (2023.01); *B64U 2201/10* (2023.01); *G01H 9/00* (2013.01); *G01S 7/41* (2013.01); *G01S 7/4802* (2013.01)

(58) Field of Classification Search
CPC ......... B64C 39/024; B64D 7/00; F41H 11/02; G01H 9/00; G01S 7/41; G01S 7/4802; G05D 1/12
See application file for complete search history.

(56) References Cited

U.S. PATENT DOCUMENTS

| | | |
|---|---|---|
| 2017/0059692 A1 | 3/2017 | Laufer |
| 2017/0192089 A1* | 7/2017 | Parker .................. G08G 5/0069 |

(Continued)

FOREIGN PATENT DOCUMENTS

| | | |
|---|---|---|
| CN | 108225111 | 6/2018 |
| WO | 2019067627 | 4/2019 |

*Primary Examiner* — Charles J Han
(74) *Attorney, Agent, or Firm* — Knobbe Martens, Olson & Bear, LLP

(57) ABSTRACT

The system comprises a plurality of sensor systems, a counter drone, and a processor. A sensor system of the plurality of sensor systems comprises one or more sensors that are connected to a network. The counter drone is connected to the network. The processor is configured to receive an indication of a potential target from the plurality of sensor systems; generate a fused data set for the potential target, determine whether the potential target comprises the threat drone based at least in part on the fused data set; and in response to determining that the potential target comprises the threat drone, provide counter drone instructions to the counter drone.

23 Claims, 14 Drawing Sheets

Related U.S. Application Data continuation of application No. 16/415,924, filed on May 17, 2019, now Pat. No. 11,385,659.

(51) Int. Cl.
  *G05D 1/683* (2024.01)
  *H04W 4/021* (2018.01)
  *B64U 101/15* (2023.01)

(56) References Cited

U.S. PATENT DOCUMENTS

| | | | |
|---|---|---|---|
| 2017/0261613 A1* | 9/2017 | Van Voorst | G08G 5/0069 |
| 2018/0101169 A1* | 4/2018 | Applewhite | G08G 5/00 |
| 2019/0243813 A1* | 8/2019 | Pourmohammad | G08B 19/00 |

* cited by examiner

COUNTER DRONE SYSTEM

CROSS REFERENCE TO OTHER APPLICATIONS

This application is a continuation of U.S. patent application Ser. No. 17/830,000, entitled COUNTER DRONE SYSTEM filed Jun. 1, 2022 which is incorporated herein by reference for all purposes, which is a continuation of U.S. patent application Ser. No. 16/415,924, entitled COUNTER DRONE SYSTEM filed May 17, 2019, now U.S. Pat. No. 11,385,659, which is incorporated herein by reference for all purposes.

BACKGROUND OF THE INVENTION

Drones have become prevalent and are capable of carrying payloads such as cameras and improvised explosive devices that can be misused. However, the maneuverability and ease of operating drones makes it difficult to prevent them from flying in a given region. In addition, it is difficult to detect and determine that a drone is a threat, much less intercept the drone once it has been determined to be a problem.

BRIEF DESCRIPTION OF THE DRAWINGS

Various embodiments of the invention are disclosed in the following detailed description and the accompanying drawings.

DETAILED DESCRIPTION

Figure 1:
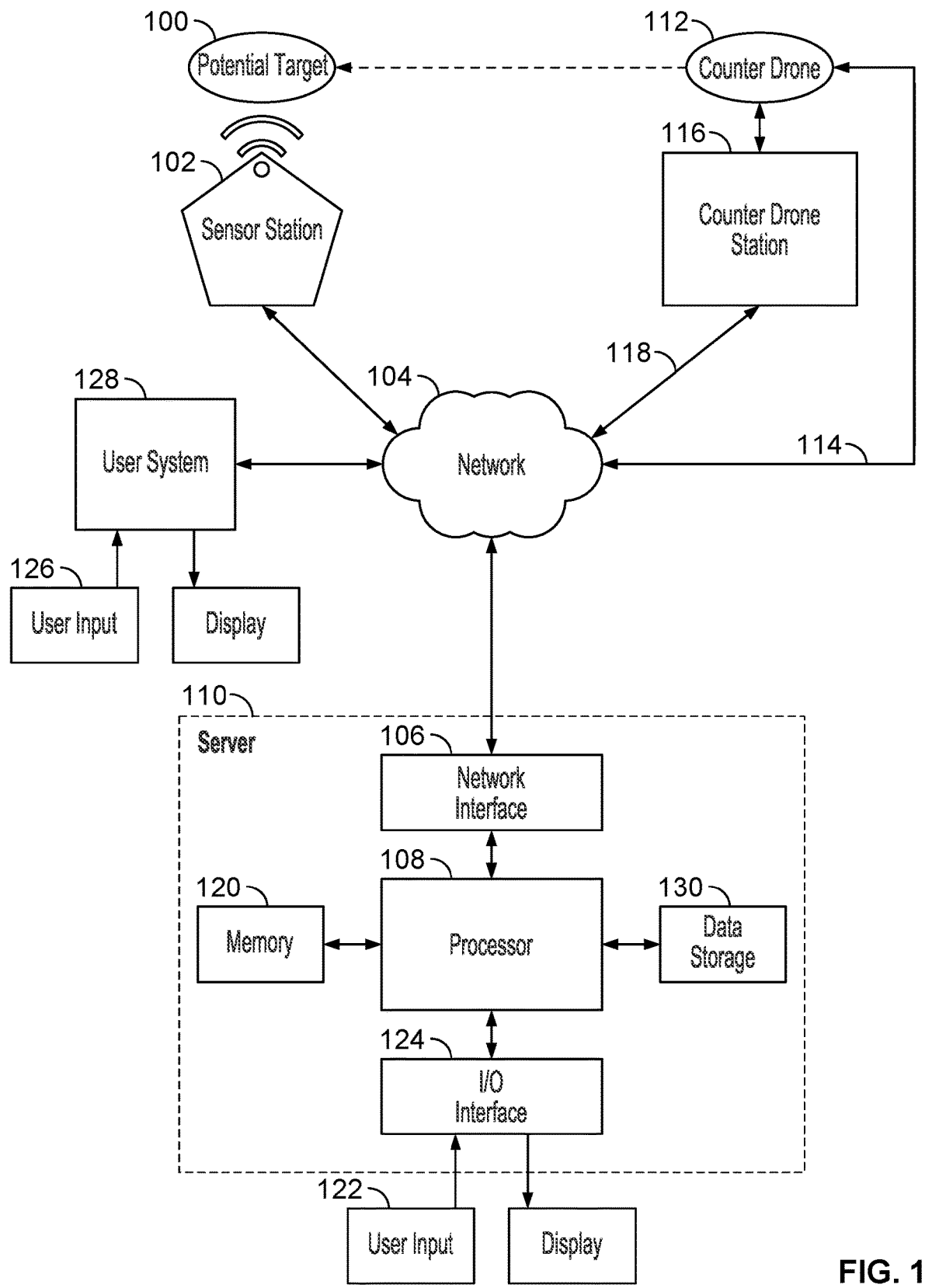
FIG. 1 is a block diagram illustrating an embodiment of a counter drone system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A counter drone system for detecting and intercepting a threat drone is disclosed. The system comprises a plurality of sensor systems, a counter drone, and a processor. A sensor system of the plurality of sensor systems comprises one or more sensors that are connected to a network. The counter drone is connected to the network. The processor is configured to receive an indication of a potential target from the plurality of sensor systems; generate a fused data set for the potential target, wherein the fused data set comprises the indication of the potential target and one or more of: another indication of the potential target, a raw sensor information, and/or a derived sensor information, wherein generating the fused data set comprises determining that the one or more of the another indication of the potential target, the raw sensor information, and/or the derived sensor information are all associated with the potential target and combining the one or more of the another indication of the potential target, the raw sensor information, and/or the derived sensor information; determine whether the potential target comprises the threat drone based at least in part on the fused data set; and in response to determining that the potential target comprises the threat drone, provide counter drone instructions to the counter drone. In some embodiments the system further comprises a memory and/or user interface that is coupled to the processor and configured to provide the processor with instructions.

The counter drone system monitors a surrounding area using sensors in one or more sensor systems (e.g., in stations, towers, drones, drone stations, mounted on vehicles, mounted on humans, mounted on telephone poles, mounted on buildings, etc.). The counter drone system detects an object (e.g., using a fusion of information derived from the sensor systems) and makes a determination of whether the object is a threat drone. The counter drone system detects the object using a plurality of sensor systems. The sensor systems comprise one or more sensors and a processor that are networked together. Each sensor systems contributes raw sensor information from its sensors or derived sensor information that has been processed from the raw sensor information towards detecting the object. The raw sensor information and derived sensor information from the plurality of sensor systems is fused to make a coherent and comprehensive picture of the object. This data processing is determined at one processor (e.g., at a server, at a sensor system, at a counter drone, etc.) or using multiple processors (e.g., some fusion/derivation performed at a sensor system, some at a server, and some at a counter drone).

The fusion of the data from the sensors comprises one or more of the following: receiving the raw sensor information, receiving derived sensor information, processing raw sensor information into derived sensor information (if appropriate), determining whether the raw sensor information and derived sensor information are associated with an object (e.g., determining that the information has to do with the same object), determining whether the information is consistent with other information associated with the object (e.g., determining whether the data should be averaged in or thrown out as an outlier or spurious data), determining combinations or multidimensional views from the different data and from the different sensors (e.g., overlaying data, averaging data, creating statistical views including averaging, determining variations such as deviations or distributions, transforming data based on the sensor of origin—for example, calibrating for a given sensor's characteristics, geometrically transforming for view point of origin, etc., or any other appropriate transformation), and/or creating a fused database or data set that includes data objects with associated raw sensor information, derived sensor information, transformed information, overlaid information, statistical information, time history information, similar object information (e.g., from a historical information database).

The fused data set is then used to determine whether the object comprises a threat object—specifically, whether the object comprises a threat drone.

In response to determining that the object is the threat drone, instructions are provided to a set of counter drones based on a strategy. The strategy indicates how many counter drones should be employed and what payload they should carry to engage the threat drone. For example, the strategy indicates an objective for what to do with the threat drone—for example, whether to destroy, disable, or capture the threat drone. The objective of the strategy dictates the type of payload or type of drone needed to execute the strategy and how to achieve the objective.

The counter drone system includes a network that ties one or more sensor systems and one or more counter drone stations together to monitor and protect a geo-fenced area against incoming threat drones. In some embodiments, the network further comprises a mesh network. In various embodiments, the sensor system(s) and counter drone station are co-located and/or are integrated into a single platform. In some embodiments, the sensor system is used to identify objects that are not threat drones (e.g., birds, airplanes, etc.). Sensor system data is fused together for drone detection and/or for guidance of a counter drone.

The counter drones are potentially equipped with one or more payloads, wherein a payload comprises a kinetic payload, an explosive payload, a capture net, a camera, or a signal marker. The sensor systems, in coordination with the network, provide a plurality of raw and/or derived sensor information to a server processor to aid in determining which intercept drone(s) to launch in response to an incoming threat drone(s), based on the available and desired counter drone properties (e.g., battery levels, payload(s), etc.), and in consideration of intercept probabilities. The intercept probabilities are determined based on raw and/or derived sensor information that indicates a quantity, a size, a type, a position, an altitude, a velocity, an acceleration, and/or trajectory of a given detected threat drone as well as possibly information about local environmental conditions (e.g., a time of day, local visibility, an ambient temperature, a wind speed, a wind direction, a level of fog, rain, or snow, etc.).

The response strategies that can be employed by the counter drone system are configurable by an administrator of the system. The configuration of the response strategy is based on parameters—for example, one or more of the following: a protected area's characteristics (e.g., a location near public areas, a location near military areas, a location near traffic corridors, etc.), a level of desired protection for the protected area (e.g., critical, expendable, etc.), a state of activity near the protected area (e.g., a war zone, a border area, a civilian area, etc.), or any other appropriate parameters.

The disclosed counter drone system is an improvement over other counter drone measures by enabling sensor data fusion to detect a threat drone and/or enabling autonomous handoff of terminal guidance from the server processor to one or more counter drones resulting in improved efficacy and speed. The system is designed to overcome existing limitations by coordinated sensing, communication, and autonomous deployment of a potential multiplicity of counter drones, payloads, and intercept strategies for the rapid destruction, disablement, or capture of incoming threat drone(s). The system also allows for user intervention at any time during system operation.

FIG. 1 is a block diagram illustrating an embodiment of a counter drone system. In the example shown, potential target 100 is detected by sensor station 102 which communicates raw sensor data and/or derived sensor information via network 104 and network interface 106 to processor 108 housed within server 110. Processor 108 uses the received raw sensor data and/or derived sensor information to determine whether potential target 100 comprises a threat drone; and in response to determining that potential target 100 comprises the threat drone, provides counter drone instructions to counter drone 112 via network 104. In some embodiments, the counter drone instructions include instructions for when counter drone 112 is to assume guidance control (e.g., autonomous control) for intercepting a threat drone and when counter drone 112 is to relinquish guidance control back to a server 110. In some embodiments, autonomous control of counter drone 112 enables more rapid reaction to local sensor information in order to improve interception of a threat drone while still using information from server 110 (e.g., sensor information aggregated from a plurality of sensor stations such as sensor station 102). Communication with counter drone 112 may be direct via wireless communication path 114, or via counter drone station 116 using communication path 118. In various embodiments, communication path 118 comprises a wired and/or wireless communication path. Examples of wireless communications useful to practice the disclosed invention comprise radio (RF) and microwave frequencies—both satellite and/or terrestrial—infrared (IR), free-space optical, sonic, ultrasonic, and electromagnetic induction (e.g., a short-range RFID tag). Examples of wired communication methods comprise twisted-pair, coaxial, and fiber optic cables. In various embodiments, network 104 comprises wired and/or wireless communication networks comprising standard, hybrid, and/or proprietary networks (e.g., a local area network, a wide area network, a virtual private network, a mesh, etc.).

Processor 108 allows for various approaches to generate derived sensor information and determine whether potential target 100 comprises the threat drone. In some embodiments, automated learning, based on adaptive neural networks, or other algorithmic approaches (e.g. image recognition, predictive modeling, etc.), are employed by processor 108. In some embodiments, automated learning uses data collected from indicated potential targets that are determined to not be a threat drone to more quickly and definitively determine that a potential target is not a threat—for example, a neural network is trained on a training set of confirmed non-threat drones to appropriately identify that a potential target is not a threat. For example, an image profile of a bird has unique characteristics that differ from any type of drone (e.g., wing shape, wing markings, body shape, body markings, tail characteristics (e.g. length, shape, or color, etc.), wing rhythm, flight path, sound, and/or whether it is part of a flock).

Processor 108 receives instructions stored on and/or provided by memory 120, along with optional user input 122 via I/O interface 124, and/or user input 126 via user system 128, to determine optimal counter drone instructions upon determination that potential target 100 comprises the threat drone.

Memory 120 stores raw sensor data and/or derived sensor information from sensor station 102; sensor station 102 status (e.g. online, offline, a malfunction indication, etc.); location information for counter drone 112, counter drone station 116 and sensor station 102; counter drone 112 status information (e.g., a battery level information); or any other appropriate information to facilitate operation of the counter drone system.

Data storage unit 130 is used to store counter drone system (FIG. 1) initial configuration information; maintenance records; system logs; event logs; or any other appropriate information to facilitate operation and upkeep of the counter drone system. Initial counter drone system configuration information comprises available payload information for counter drone station 116; threshold determination levels (e.g., an upper altitude threshold level, a lower altitude threshold level, a maximum velocity threshold level, a probability threshold level, etc.); known or suspected drone profiles (e.g., an image profile, a vibration profile, an RF profile, and/or a sound profile etc.); or any other appropriate information to facilitate operation of the counter drone system.

A suspected drone profile comprises a profile that exhibits characteristics similar to a drone (e.g., a size, a velocity, a sound frequency, RF emissions, etc.), but is not a known image profile or other unique and definitive drone profile. In various embodiments, known drone profiles comprise threat drones, non-threat drones, or any other appropriate type of drones.

In some embodiments, network 104 is not required and direct communication links enable communication between system components (e.g., sensor station 102, counter drone station 116, user system 128, server 110, etc.).

Figure 2:
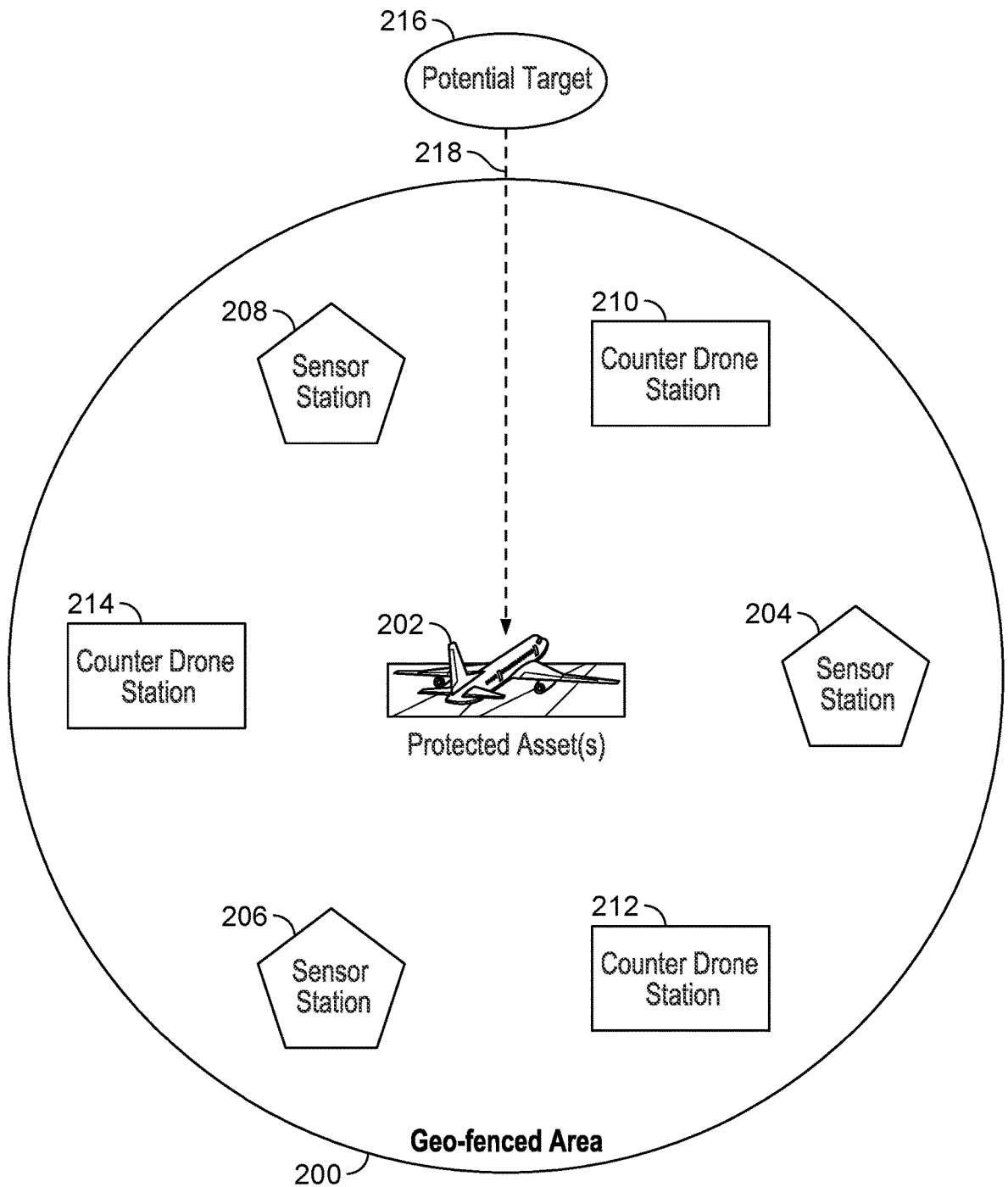
FIG. 2 is a block diagram illustrating an embodiment of sensor stations and counter drone stations within a geofenced area.

FIG. 2 is a block diagram illustrating an embodiment of sensor stations and counter drone stations within a geo-fenced area. In some embodiments, potential target 216, sensor station 208, and counter drone station 210 of FIG. 2 correspond to potential target 100, sensor station 102, and counter drone station 116 of FIG. 1. In the example shown, geo-fenced area 200 surrounds protected asset(s) 202 and includes one or more sensor stations (e.g., sensor station 204, sensor station 206, sensor station 208, etc.) and one or more counter drone stations (e.g., counter drone station 210, counter drone station 212, counter drone station 214, etc.). In the event potential target 216 is determined to be a threat drone using raw sensor data and/or derived sensor information provided by one or more sensor stations, a counter drone can be instructed to protect against potential target 216 as it travels on trajectory path 218 towards protected asset 202.

In various embodiments, one or more sensor stations and counter drone stations are fixed and/or mobile. The sensor stations and counter drone stations are operated to provide continuous protection against threat drones entering geo-fenced area 200. In various embodiments, geo-fenced area 200 is dynamically defined (e.g., a radius around a point location) or is statically defined based on a predefined set of coordinates (e.g., a set of map coordinates) and/or local physical features (e.g., a mountain, a wall, a fence, a building, etc.). In various embodiments, there is a single geofenced area; there are more than one geo-fenced areas that are separate, overlapping, and/or contained with other geo-fenced areas; or any other appropriate arrangement of areas. In some embodiments, one or more geo-fenced areas are used for defining operational zones each with different administrative guidelines. For example, a geo-fenced 'safety zone' (not shown in FIG. 2) in or around protected asset(s) 202 stipulates instructions for the counter drone system not to use explosive payloads within the safety zone, whereas explosive payloads are permissible outside of the safety zone.

Figure 3:
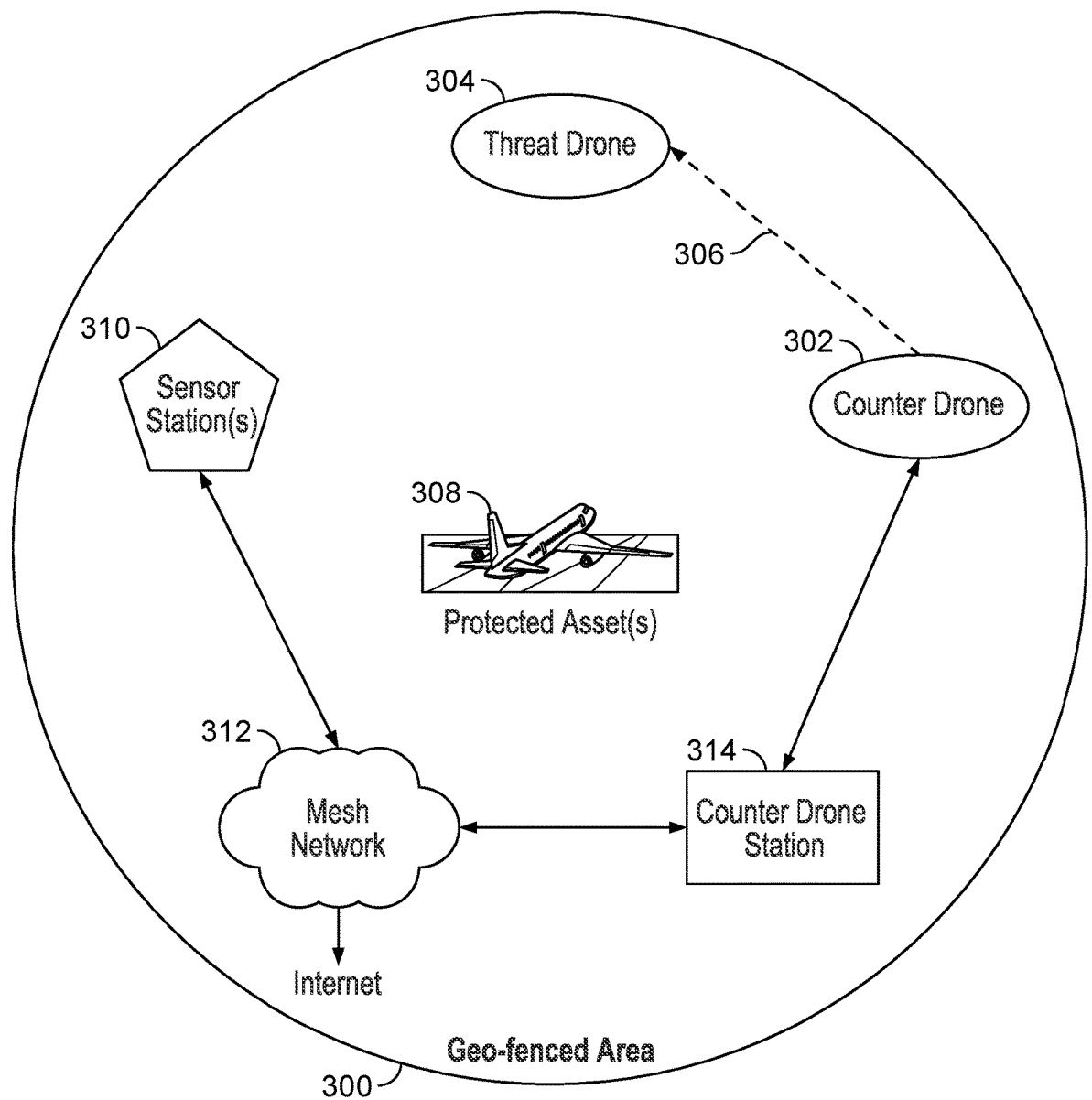
FIG. 3 is a block diagram illustrating an embodiment of a mesh network communicating instructions to a counter drone to intercept a threat drone.

FIG. 3 is a block diagram illustrating an embodiment of a mesh network communicating instructions to a counter drone to intercept a threat drone. In some embodiments, threat drone 304, counter drone 302, counter drone station 306, mesh network 312, and sensor stations(s) 310 of FIG. 3 correspond to potential target 100, counter drone 112, counter drone station 116, network 104, and sensor stations 102 of FIG. 1. In the example shown, counter drone 302 has been given instructions to intercept threat drone 304 via flight path 306 before threat drone 304 reaches protected asset(s) 308 located within geo-fenced area 300. In some embodiments, intercept instructions instruct counter drone 302 to eliminate threat drone 304 by delivering a kinetic payload. In some embodiments, the kinetic payload is not a separate payload attached to counter drone 302 but is the entire counter drone 302. The goal of an instruction to eliminate threat drone 304 is either destruction or disablement of threat drone 304. In some embodiments, intercept instructions instruct counter drone 302 to capture threat drone 304 by deploying a net or using other capture payload(s) (e.g., a hook, a tethered spear, etc.) from counter drone 302.

In the example shown, sensor station(s) 310 provides raw sensor data and/or derived sensor information via mesh network 312 useful in determining the intercept strategy to a server (not shown in FIG. 3). The server then determines appropriate instructions and provides the instructions via mesh network 312 and counter drone station 314 to counter drone 302. Sensor station(s) 310 monitors the progress of counter drone 302 towards achieving its objective and reports monitoring data to the server as well. Interception progress is also monitored directly by sensors on board counter drone 302 and progress data is sent to the server via a wireless communication system of counter drone 302. In some embodiments, successful threat drone interception is indicated by the deployment of a signal marker payload from counter drone 302 that is detected by sensor station(s) 310 and relayed to the server via mesh network 312.

In various embodiments, interception instructions to counter drone 302 include instructions of when counter drone is controlled from a server for flight instructions, when counter drone assumes control from server to assume direct control for flight instructions, how to determine when to assume direct control (e.g., proximity to threat drone 304 less than a threshold, estimated time to intercept threat drone 304 less than a threshold, etc.), how to determine when to relinquish control for flight back to server (e.g., e.g., proximity to threat drone 304 greater than a threshold, estimated time to intercept threat drone 304 greater than a threshold, etc.), or any other appropriate instructions.

Figure 4:
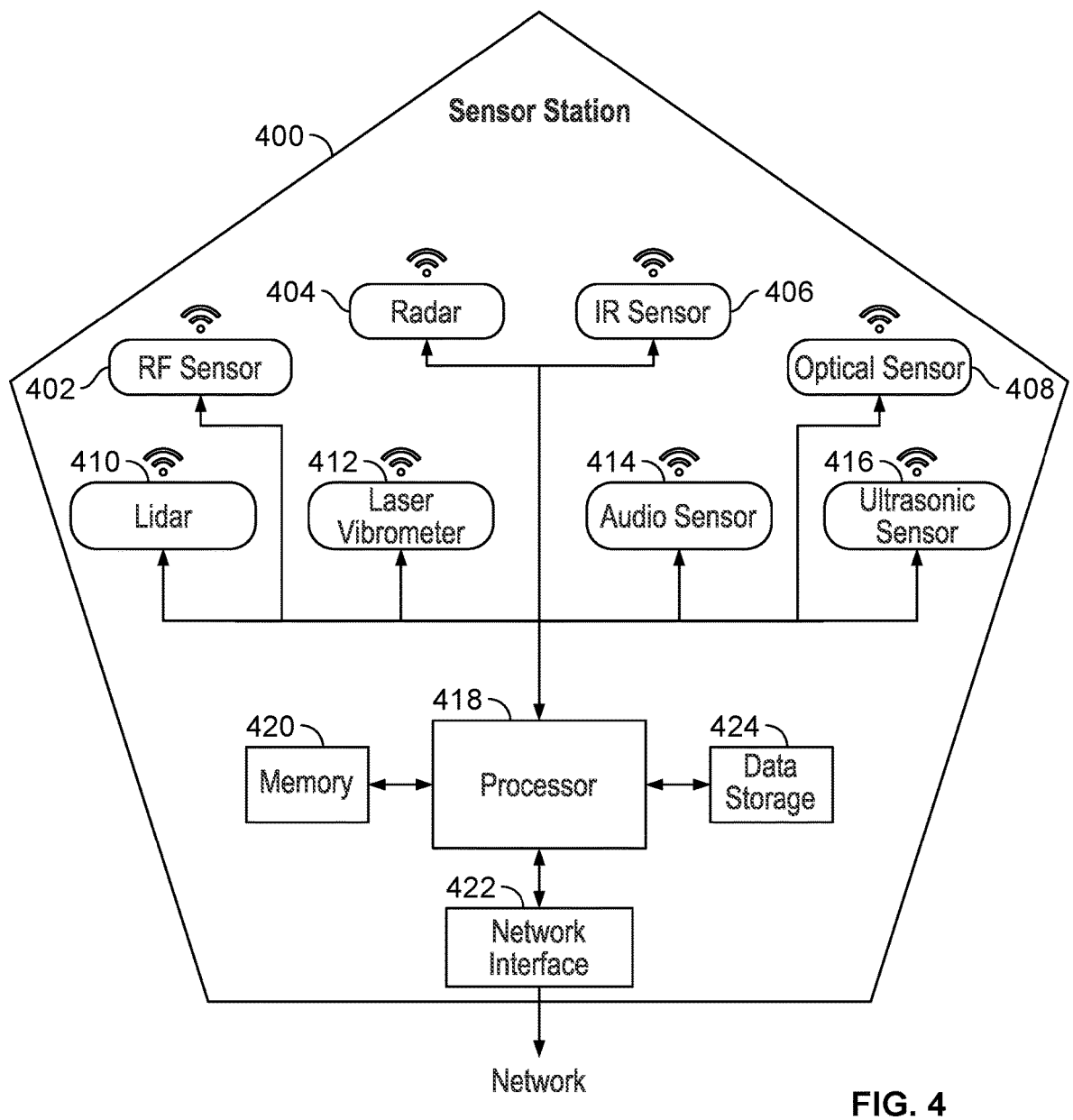
FIG. 4 is a block diagram illustrating an embodiment of a sensor station.

FIG. 4 is a block diagram illustrating an embodiment of a sensor station. In some embodiments, sensor station 400 of FIG. 4 is used to implement sensor station 102 of FIG. 1. In the example shown, sensor station 400 comprises one or more sensors (e.g., RF sensor 402, radar sensor 404, IR sensor 406, optical sensor 408, lidar sensor 410, laser vibrometer sensor 412, audio sensor 414, ultrasonic sensor 416, etc.).

The one or more sensors produce raw sensor information comprising a radio frequency data, an infrared data, an optical data, a lidar data, a radar data, an audio data, an ultrasonic data, or other appropriate raw sensor information. Sensor station 400 uses its one or more sensors to monitor for potential targets that are inside and/or outside one or more geo-fenced areas. In various embodiments, sensor station 400 comprises a mobile sensor tower or a fixed or permanent installation. In some embodiments, one or more counter drones with on-board sensors function as a mobile sensor station. In some embodiments, a sensor system is human mounted and functions as a mobile sensor station.

The one or more sensors communicate raw sensor information to processor 418. In some embodiments, raw sensor data is provided to a server that generates derived sensor information from the received raw sensor information. In some embodiments, processor 418 generates derived sensor information from the received raw sensor information, which is then sent on to the server processor. In some embodiments, automated learning, based on adaptive neural networks, or other types of algorithmic approaches, are employed by processor 418 using instructions stored on and/or provided by memory 420. In some embodiments, processing of sensor data is performed at sensor station 400, a server, or at a counter drone station, or on a counter drone based at least in part on where the processing is most efficient and expeditious as time and process constraints are critical to system performance—for example, processing speed and time to transmit data are accounted for to determine optimal location for processing (e.g., in the event that it makes more sense to process locally sensor data in order to reduce transmission times so that only summary data is sent to a server, then this strategy is employed, in the event that central server processing of data is more efficient because data can be aggregated across multiple servers, then data is shipped to a server to process, etc.). Memory 420 also stores raw sensor data and/or derived sensor information; sensor status (e.g. online, offline, a malfunction indication, etc.); or any other appropriate data or information to facilitate operation of sensor station 400. In various embodiments, derived sensor information comprises an altitude, a position data (e.g., an x-y map coordinate, a longitude and a latitude, etc.), a location within a geo-fenced area, a target trajectory, a radar image, an infrared image, an optical image, a lidar image, a vibration profile, a sound profile, an RF profile, an absence or a presence of an RF immunity beacon, or any other appropriate derived information from raw data.

In some embodiments, an indication of the absence or a presence of an RF immunity beacon is relayed by processor 418 to the server processor via network interface 422. In some embodiments, altitude information derived by processor 418 is compared to a threshold altitude value stored in data storage unit 424, and an indication of the outcome relayed to the server. In some embodiments, a position data is used by processor 418 to determine whether the potential target is within a geofenced area, and an indication of the outcome relayed to the server. In some embodiments, a target trajectory is used by processor 418 to determine whether the potential target will take it within a radius of a geofenced area, and an indication of the outcome relayed to the server. In some embodiments, derived sensor information is used by processor 418 to generate the potential target's image profile, vibration profile, RF profile, and/or sound profile, and compared to known or suspected drone profiles stored in data storage unit 424. Indications of the outcomes of these comparisons are relayed to the server.

In some embodiments, the server uses the above derived information to determine instructions for a counter drone. In some embodiments, the server provides the raw sensor data and/or derived sensor information to a user system for a user to review or monitor. In some embodiments, the server derives the above information using raw sensor data received from one or more sensor stations (e.g., aggregating data for a better determination).

In some embodiments, processor 418 autonomously determines instructions for a counter drone and provides these instructions to the counter drone(s).

In various embodiments, sensor station 400, counter drone sensor system, a vehicle mounted sensor system, and/or a human mounted sensor system is/are used as a sensor system that provide(s) raw data and/or derived data used for detection of a threat drone and/or guidance for the counter drone toward the threat drone.

Figure 5:
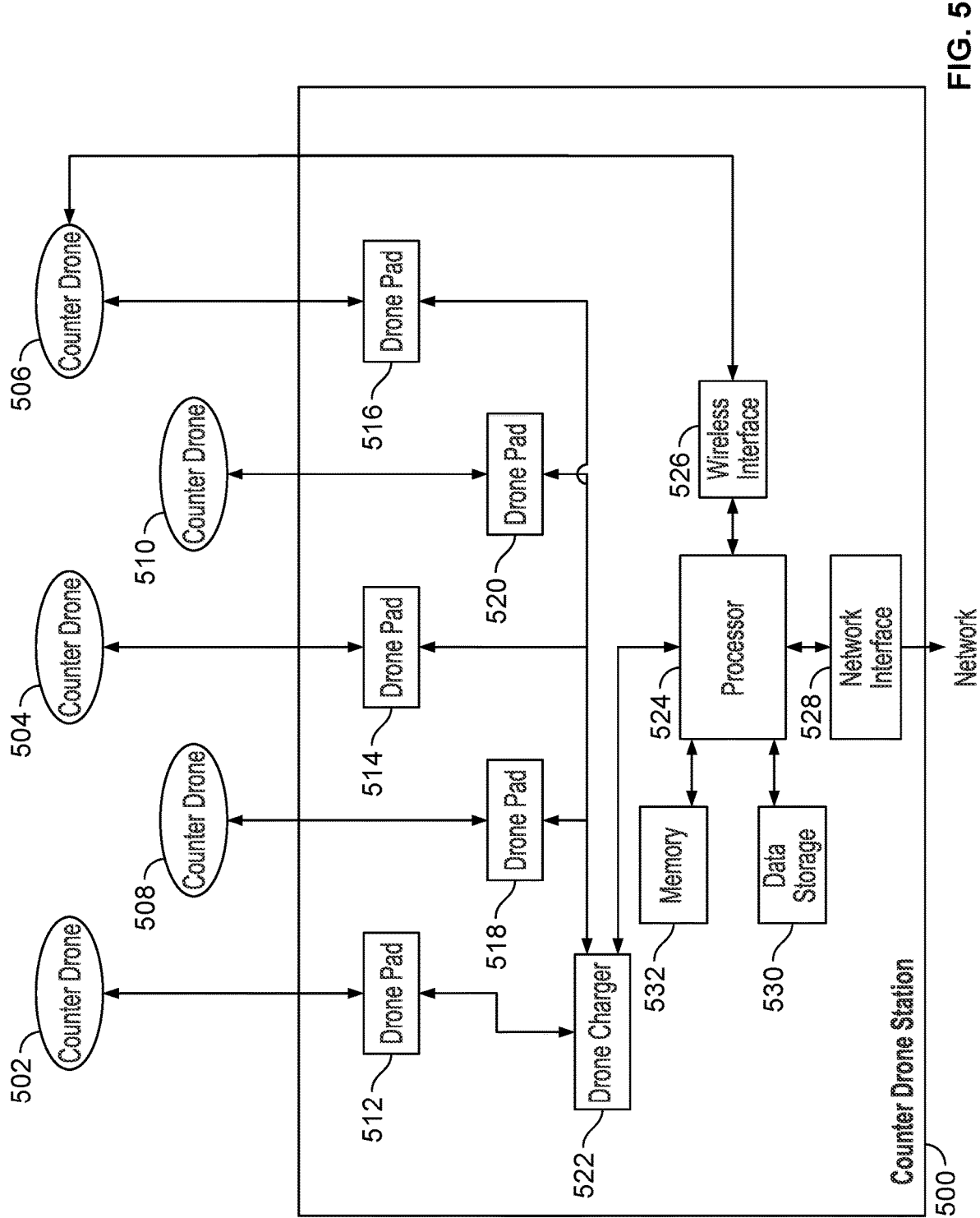
FIG. 5 is a block diagram illustrating an embodiment of a counter drone station.

FIG. 5 is a block diagram illustrating an embodiment of a counter drone station. In some embodiments, counter drone station 500 is used to implement counter drone station 116 of FIG. 1. In the example shown, counter drone station 500 comprises multiple counter drones (e.g., counter drone 502, counter drone 504, counter drone 506, counter drone 508, counter drone 510, etc.) that are in communication with one or more drone pads (e.g., drone pad 512, drone pad 514, drone pad 516, drone pad 518, drone pad 520, etc.). In some embodiments, counter drone station 500 is located inside and/or outside the protected geo-fenced area. In various embodiments, counter drone station 500 comprises a mobile platform or a fixed or permanent installation. The connections between the one or more drone pads and the one or more counter drones may comprise electrical and/or physical connections.

In some embodiments, counter drone station 500 comprises an external housing that provides protection to the counter drones during inclement weather or from attack by outside forces. In some embodiments, one or more counter drones are physically attached to one or more drone pads by physical methods (e.g., a remote-controlled clamp) to secure the counter drones against wind, ground movement, or other vibrations.

In some embodiments, the multiple drone pads are electrically connected to drone charger 522 to provide energy to charge, or maintain the charge of, one or more counter drone batteries. The electrical connection between a drone pad and a counter drone may comprise a hard-wire connection or an electromagnetic inductive coupling. In various embodiments, drone charger 522 is an intelligent charger having temperature or voltage sensing circuits and a microprocessor controller to safely adjust the charging current and voltage, determine the state of charge, and cut off at the end of charge; comprises one or more types of stand-alone, or integrated, charging units to provide fast-charge and trickle charge capabilities; and/or derives its energy from solar power, wind power, or any other desired energy source; or any other appropriate configuration or makeup of a charger.

In some embodiments, counter drone station 500 houses a power bank that stores an electrical reserve of energy to provide charging power to the one or more counter drone batteries. In some embodiments, counter drone station 500 employs more than one source of energy to provide improved system robustness by protecting against failure of one or more energy sources.

In the example shown, drone charger 522 communicates to the server processor via processor 524 and network interface 528 and to counter drone 506 via processor 524 and wireless interface 526. Processor 524 is able to communicate to counter drone 502, counter drone 504, counter drone 506, and/or counter drone 508 via wireless interface 526. In some embodiments, processor 524 determines threat drones from information regarding potential target drones (e.g., employing automated learning based on adaptive neural networks, or other algorithmic approaches using instructions stored on and/or provided by memory 532, etc.). Memory 532 also stores counter drone status for counter drone 502, counter drone 504, counter drone 506, counter drone 508, and counter drone 510 (e.g. online, offline, a malfunction indication, a battery level information, etc.), or any other appropriate information to facilitate operation of counter drone station 500. Calculations useful in determining intercept strategies and counter drone instructions, such as those done by the server processor and/or sensor station processor may also be done in whole or in part by processor 524 to provide system redundancy and/or reduce system counter-response latencies. Data storage unit 530 is used to store available payload information, maintenance records, system logs, event logs, or any other appropriate information to facilitate operation and upkeep of counter drone station 500.

In various embodiments, counter drone station 500 enables renewing energy supply of a counter drone by swapping a battery of a counter drone, refueling a battery of a counter drone, recharging a battery of a counter drone or payload of a counter drone, or any other appropriate manner of renewing the energy supply of a counter drone.

In some embodiments, counter drone station 500 is mounted on a vehicle.

Figure 6:
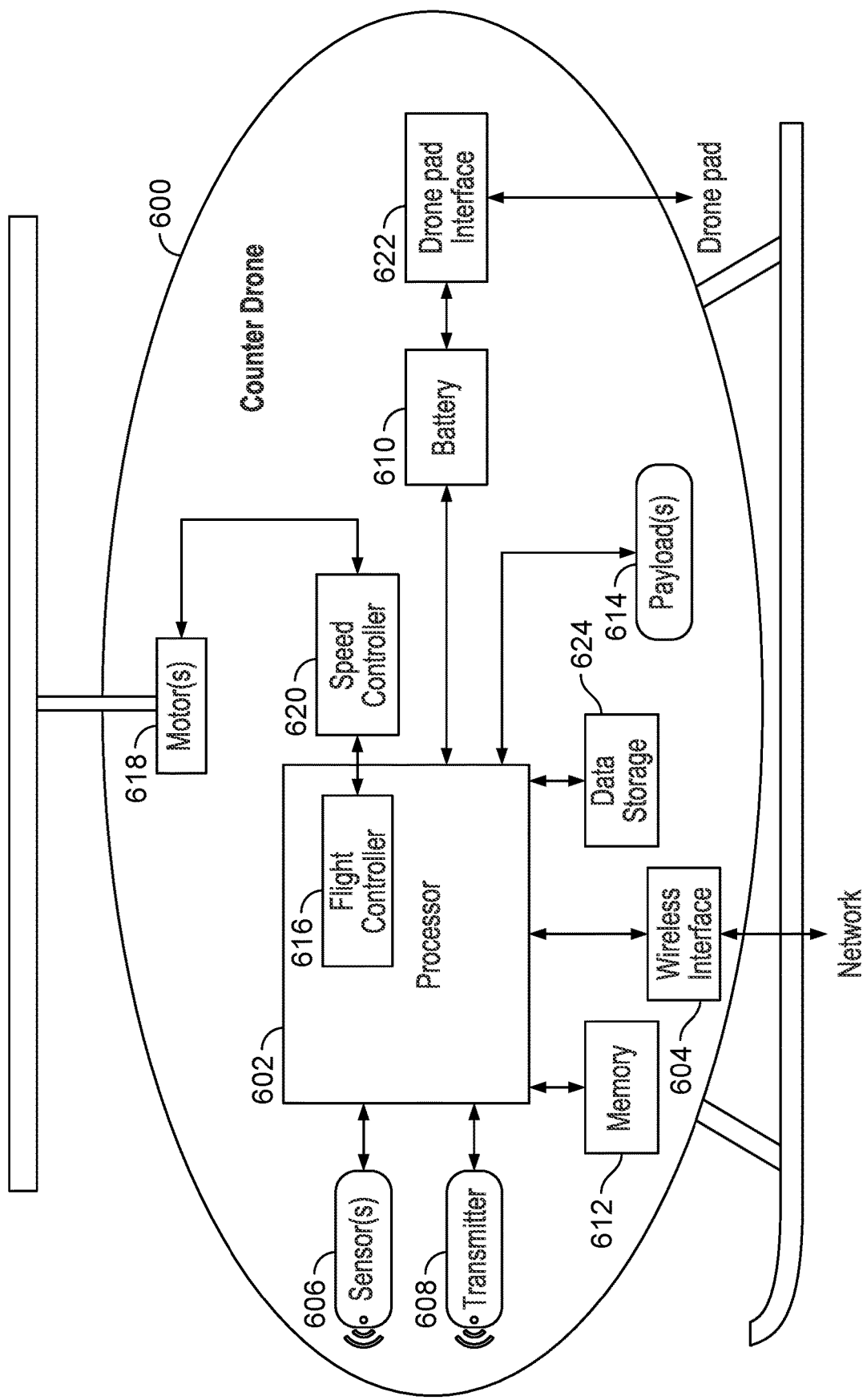
FIG. 6 is a block diagram illustrating an embodiment of a counter drone.

FIG. 6 is a block diagram illustrating an embodiment of a counter drone. In some embodiments, counter drone 600 of FIG. 6 is used to implement counter drone 112 of FIG. 1. In the example shown, processor 602 receives counter drone instructions via wireless interface 604. Wireless interface 604 enables communication with a sensor station, a server, and/or a counter drone station.

In various embodiments, sensor(s) 606 comprise one or more of the following: an RF sensor, an IR sensor, an optical sensor, a lidar sensor, a radar sensor, an audio sensor, an ultrasonic sensor, an air speed sensor, or any other appropriate sensor. In some embodiments, sensor(s) 606 and processor 602 comprise a terminal guidance system. For example, the terminal guidance system comprises a guidance system that is primarily or solely active during the terminal phase, just before the counter drone and/or counter drone payload intercepts its target. In some embodiments, processor 602 is configured to enable fusion of sensor data from sensor(s) 606 and/or external sensor(s) (e.g., sensor station sensor(s) and/or drone station sensor(s) and/or other drone sensor(s)) and computer vision functionality in order to facilitate drone detection and/or terminal guidance. In some embodiments, sensor(s) 606 are used to provide additional or updated sensor information about one or more potential target characteristics to the server processor (e.g., a location of a potential target drone). For example, an improved resolution image would enable the server processor to determine an improved probability over a previously determined threat drone characteristic (e.g., a type, a size, a payload, a velocity, etc.) For example, a previously determined threat drone characteristic comprised a characteristic as measured by a sensor station sensor(s), or a counter drone sensor(s), that was farther away, used a lower quality sensor, and/or used a sensor of a different type than sensor(s) 606. In some embodiments, sensor(s) 606 is used to monitor the progress of a threat drone intercept action for use by its terminal guidance system and/or the server processor.

Transmitter 608 comprises an RF transmitter useful as an immunity beacon. Processor 602 monitors on-board system readiness and operational status, including the charge level of battery 610, and relays the state of counter drone 600 readiness and operational status to the main server processor via wireless interface 604. In some embodiments, processor 602 uses instructions stored on and/or provided by memory 612 to process the received counter drone instructions. Memory 612 also stores received intercept instructions including a flight path, payload information, location information for counter drone stations, status information, or any other appropriate information to facilitate operation of the counter drone system. In various embodiments, the instructions are for intercepting the identified threat drone and delivering payload(s) 614, for destroying the identified threat drone, for disabling the identified threat drone, for waiting in standby at some other location for further instructions, or any other appropriate instructions. The received counter drone instructions comprise a determined flight path, velocity, approach altitude, approach direction, launch time, and/or payload(s) to deploy upon threat drone interception. Payload(s) 614 comprises a kinetic payload, an explosive payload, a capture net or other capture payload, and/or a signal marker. In some embodiments, payload(s) 614 utilizes an attached payload identifier (e.g., an RFID tag) for self-identification to the counter drone station processor and/or server processor. In some embodiments, counter drone 600 and/or a kinetic payload is/are designed to maximize kinetic effect if rammed into a target drone. In some embodiments, kinetic effect is maximized by a counter drone design that is fast and has a focused impact point. In various embodiments, speed of a drone is improved by having a low drag, a high thrust to weight ratio, a high stability design to minimize vibration, or any other appropriate design to create a fast counter drone. In some embodiments, the focused impact point comprises a pointed front for the counter drone, a projectile payload, or any other appropriate manner for creating a focused impact point. In some embodiments, the stability for the counter drone is improved using fins, ailerons, flight control surfaces, spinning, or any other appropriate stability mechanism.

In various embodiments, the counter drone instructions include instructions of when counter drone is controlled from a server for flight instructions, when counter drone assumes control from server to assume direct control for flight instructions, how to determine when to assume direct control (e.g., proximity to threat drone 304 less than a threshold, estimated time to intercept threat drone 304 less than a threshold, etc.), how to determine when to relinquish control for flight back to server (e.g., e.g., proximity to threat drone 304 greater than a threshold, estimated time to intercept threat drone 304 greater than a threshold, etc.), or any other appropriate instructions. In some embodiments, the counter drone instructions include instructions for determining whether to use target location information and/or flight path information from a server and/or target location information and/or flight path information as determined using the counter drone processor (e.g., processor 602). For example, the target location information and/or flight path information may be more accurate from the server (e.g., as informed by multiple counter drone sensors and multiple sensor stations) or may be more accurate and/or with less temporal latency as determined locally by a counter drone processor using local sensor information and/or some or no information from outside sources. In various embodiments, the flight instructions indicate decision criteria for determining whether to use server information/determination or local processor information/determination of target location and/or flight path information, or any other appropriate flight instructions. In various embodiments, the decision criteria comprises one or more of the following: being closer than a threshold determined distance between the counter drone and the threat drone, being farther than a threshold determined distance between the counter drone and the threat drone, moving towards the counter drone and within a threshold time of being within a threshold distance between the counter drone and the threat drone, moving away from the counter drone and within a threshold time of being more than a threshold distance between the counter drone and the threat drone, or any other appropriate criteria.

In some embodiments, processor 602 sends instructions to the drone pad and/or drone station to release any clamping devices and/or open any external housing that would impede the launch of counter drone 600. Processor 602 then communicates to the server processor that it is physically clear to launch. Based on the launch time received in the counter drone instructions, counter drone 600 proceeds to launch by processor 602 sending flight path information to flight controller 616, which in turn activates and controls counter drone motor(s) 618 via speed controller 620 to achieve liftoff.

Flight controller 616 comprises a processor, a gyro, an accelerometer, an altitude sensor (e.g., a barometer), a current sensor, a proportional-integral-derivative (PID) controller (e.g., to maintain counter drone 600 stability during flight), and other such components as standard and customary to allow flight controller 616 to navigate and maintain proper course for threat drone interception. Flight controller 616 also receives data from sensor(s) 606 (e.g., a GPS location, an air speed, a network communication, etc.) to aid in monitoring flight progress and adjusting the flight path as necessary to respond to changing external variables (e.g., a change in threat drone trajectory, an environmental condition, a strategy update received mid-flight, etc.).

Battery 610 comprises one or more lithium ion battery cells, nickel metal hydride battery cells, or any other type or number of rechargeable batteries, so as to keep the one or more counter drones in a constant state of readiness (e.g. by means of a trickle charge). Battery 610 receives charging current via drone pad interface 622, wherein drone pad interface 622 comprises a hard-wire connection or an electromagnetic inductive coupling to the drone pad. In various embodiments, battery 610 comprises more than one battery unit and/or battery type to provide system redundancy or interchangeability in the event of battery failure; or to provide a battery with the highest level of charge and/or capacity to counter drone 600 (e.g., to maximize flight time). In various embodiments, battery 610 comprises a swappable battery, a disposable battery, a refuelable cell, rechargeable cell, or any other appropriate battery type. In various embodiments, counter drone 600 is able to renew its energy supply by one or more of the following: recharge a battery, replace a battery, refuel a battery, or any other appropriate way of renewing the energy supply to counter drone 606.

In various embodiments, the system includes a plurality of counter drones and/or a plurality of counter drone stations that are in communication with each other (e.g., in a mesh communication network) to provide sensor information, processing resources, guidance information, or any other system functionality—the processing functionality can be distributed or in one location or moving from one resource to another as appropriate for rapid system response or for computation or communication efficiency.

Data storage unit 624 is used to store available payload information, maintenance records, system logs, event logs, or any other appropriate information to facilitate operation and upkeep of counter drone 600.

Figure 7:
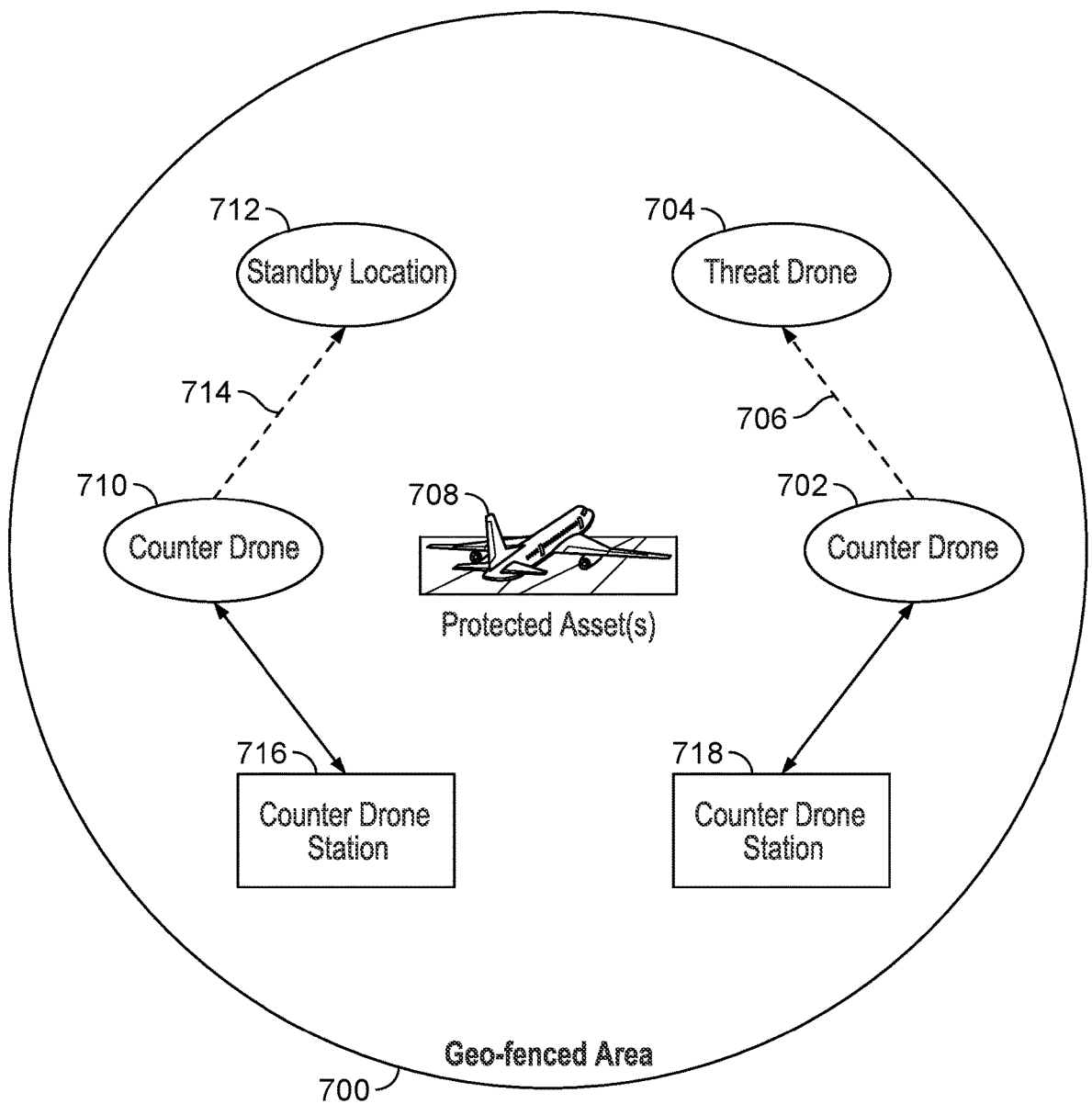
FIG. 7 is a block diagram illustrating an embodiment of a second counter drone relocating to a standby location to assist the initial counter drone in achieving its objective.

FIG. 7 is a block diagram illustrating an embodiment of a second counter drone relocating to a standby location to assist the initial counter drone in achieving its objective. In some embodiments, counter drone 702, threat drone 704, and counter drone station 718 of FIG. 7 correspond to counter drone 112, potential target 100, and counter drone station 116 of FIG. 1, respectively. In the example shown, counter drone 702 has been given instructions to intercept threat drone 704 via flight path 706 before threat drone 704 reaches protected asset(s) 708 located within geo-fenced area 700; and, counter drone 710 has been given instructions to fly to standby location 712 via flight path 714 and await further instructions. In some embodiments, counter drone 710 provides additional or updated sensor information about one or more threat drone characteristics to the server processor. The server processor determines further instructions based on the progress of counter drone 702 towards achieving its objective. In various embodiments, the server processor provides further instructions to counter drone 710 via counter drone station 716, or directly via a wireless communication system of counter drone 710. In some embodiments, standby location 712 comprises a location that is one of a set of potential flight path directions for threat drone 704. In some embodiments, counter drone 710 is provided with instructions to automatically assume control to address threat drone 704 based on proximity in space and/or time and/or location and/or flight direction of threat drone 704.

In some embodiments, further instructions instruct counter drone 710 to assist counter drone 702 in eliminating threat drone 704 by delivering a kinetic payload. In some embodiments, the kinetic payload of counter drone 710 is not a separate payload attached to counter drone 710 but is the entire counter drone 710. The goal of an instruction to eliminate threat drone 704 is either destruction or disablement of threat drone 704. In some embodiments, further instructions instruct counter drone 710 to capture threat drone 704 by deploying a net or using other capture payload (s) (e.g., a hook, a tethered spear, etc.) from counter drone 710. In some embodiments, further instructions instruct counter drone 710 to return to counter drone station 716 without deploying its payload (e.g., counter drone 702 achieves its objective without assistance).

In some embodiments, further instructions from the server processor to counter drone 710 are provided before counter drone 702 has deployed its payload(s). In some embodiments, the timing for providing further instructions to counter drone 710 is based in whole or in part on the progress of counter drone 702 towards achieving its objective. In various embodiments, the progress of counter drone 702 towards achieving its objective is reported to the server processor by various sensor station(s) (not shown in FIG. 7) within or outside geo-fenced area 700. In some embodiments, raw sensor data and/or derived sensor information from the various sensor station(s) (not shown in FIG. 7) is used by the server processor to determine the progress of counter drone 702 towards achieving its objective. In some embodiments, raw sensor data and/or derived sensor information from counter drone 710 or counter drone 702 is used by the server processor to determine the progress of counter drone 702 towards achieving its objective. In some embodiments, further instructions to counter drone 710 are provided after counter drone 702 has deployed its payload(s) (e.g., raw sensor data and/or derived sensor information received and processed by the server processor indicates that the probability of successful objective completion by counter drone 702 is below an acceptable threshold). In some embodiments, further instructions to counter drone 710 are provided after counter drone 702 has achieved its objective (e.g., counter drone 702 disables threat drone 704 and it is desired that counter drone 710 capture and return the disabled threat drone 704).

In some embodiments, counter drone 710 is one of one or more counter drones associated with counter drone station 718 or any other counter drone station that has been determined by the server processor to best assist counter drone 702 to complete its objective.

In some embodiments, one or more counter drones (not shown in FIG. 7) are instructed to fly to one or more standby locations and await further instructions to assist counter drone 702 or to engage, without standing by, in order to eliminate threat drone 704. In various embodiments, the one or more counter drones assist counter drone 702 in eliminating threat drone 704 comprising any or all of the payload options for a counter drone.

In some embodiments, one or more counter drones are instructed to fly to one or more standby locations without having detected a threat drone (e.g., threat drone 704).

Figure 10:
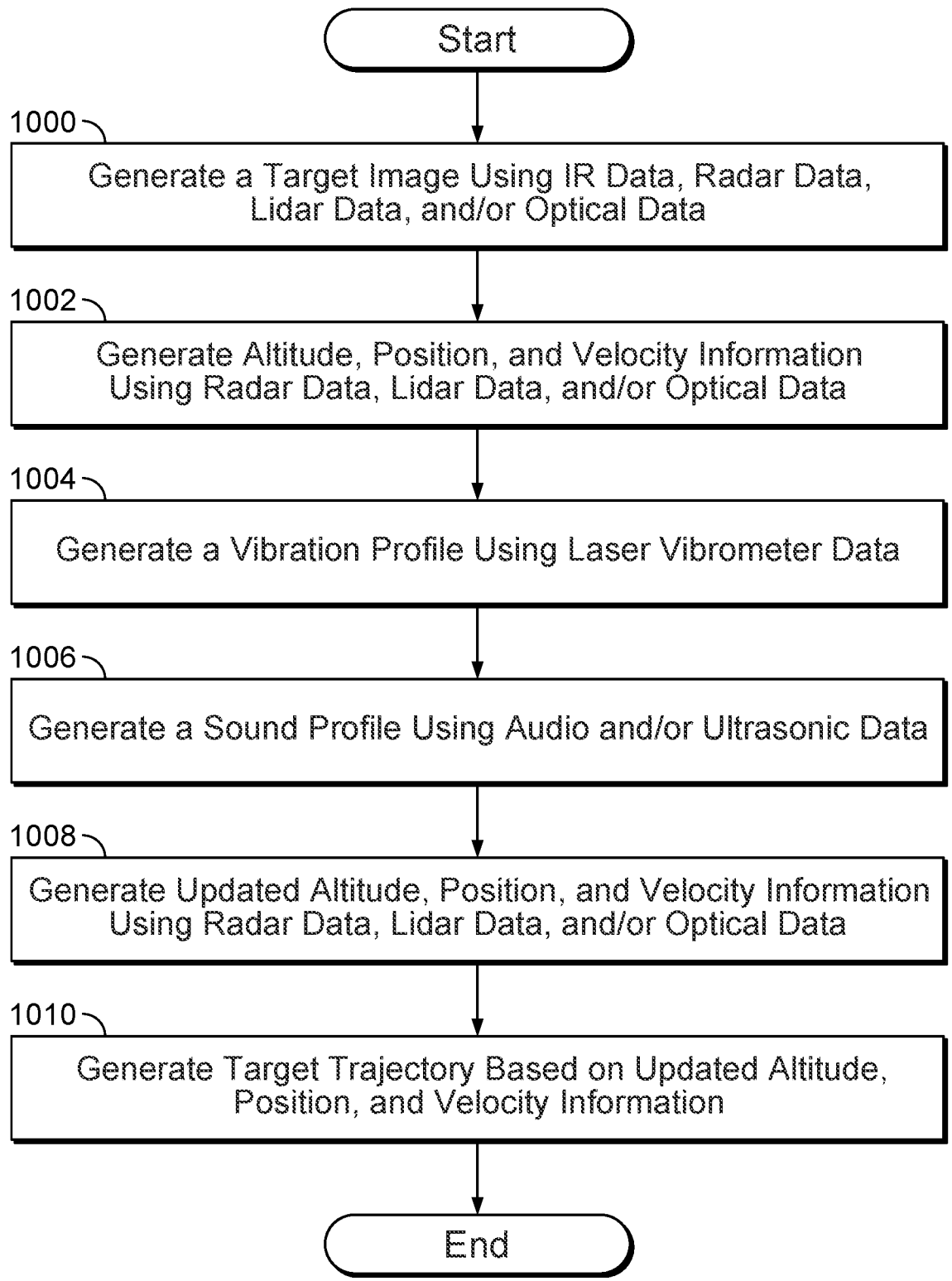
FIG. 10 is a flow diagram illustrating an embodiment of a process for generating derived sensor information using data.
Figure 11:
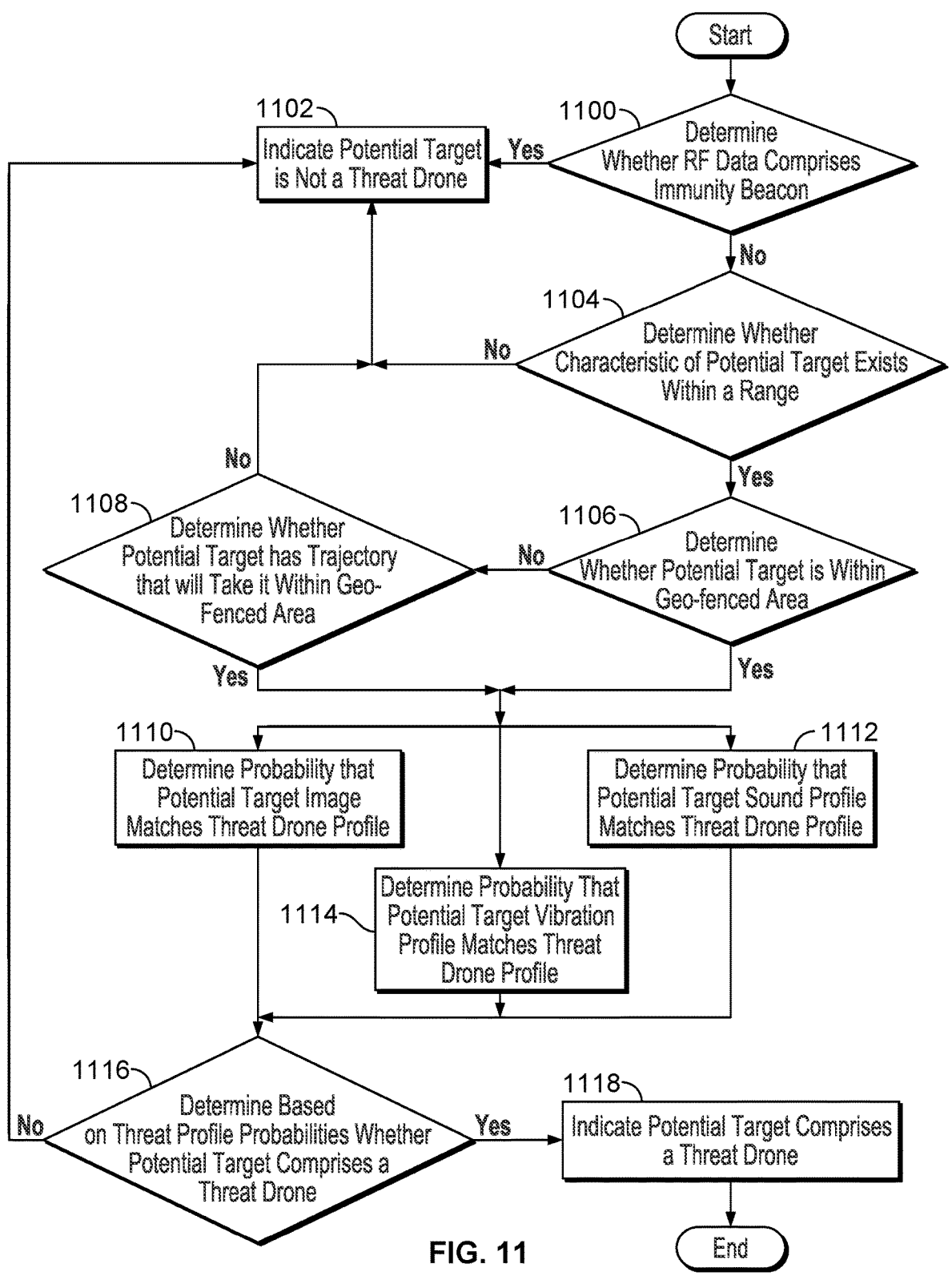
FIG. 11 is a flow diagram illustrating an embodiment of a process for determining whether a potential target comprises a threat drone and providing indication thereof.
Figure 12:
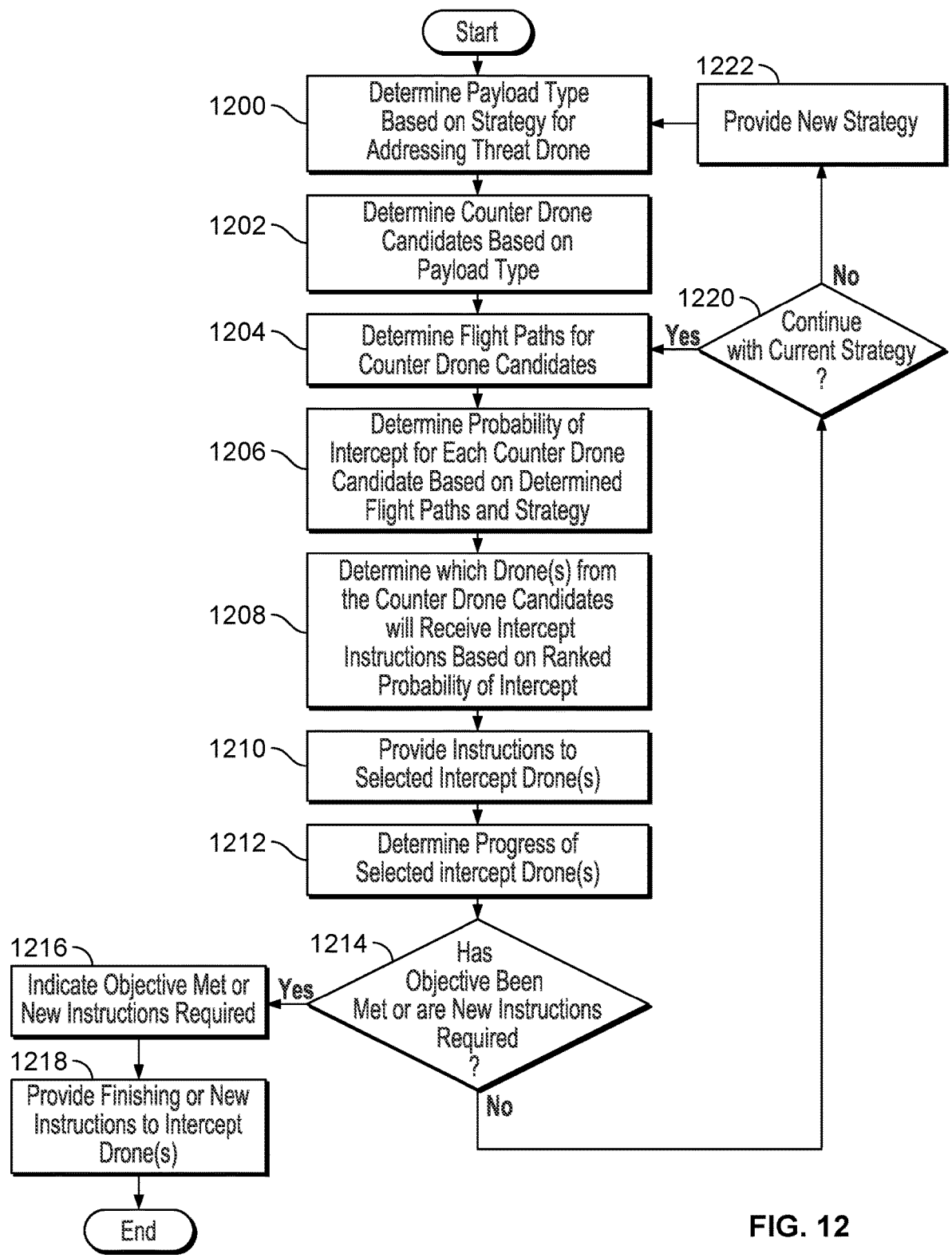
FIG. 12 is a flow diagram illustrating an embodiment of a process for intercepting a threat drone.
Figure 13:
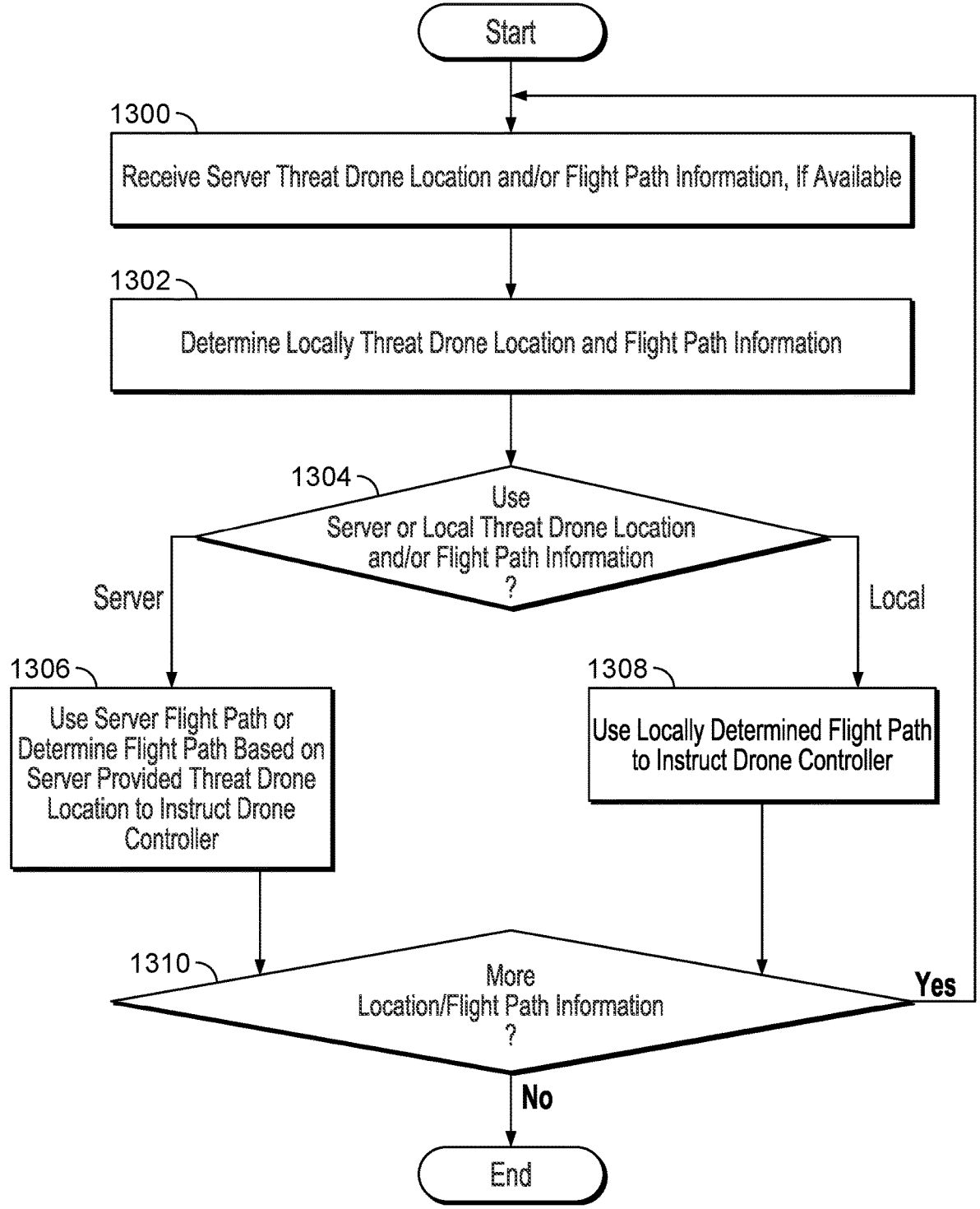
FIG. 13 is a flow diagram illustrating an embodiment of a process for instructing a drone flight controller.

In various embodiments, the processing for FIG. 10, FIG. 11, FIG. 12, and/or FIG. 13 is distributed (e.g., in a central processor or server, a counter drone processor, a sensor station processor, a drone station processor, etc.) or in one location (e.g., in a central processor or server, a counter drone processor, a sensor station processor, or a drone station processor, etc.) or moving from one resource to another as appropriate for rapid system response or for computation or communication efficiency.

Figure 8A:
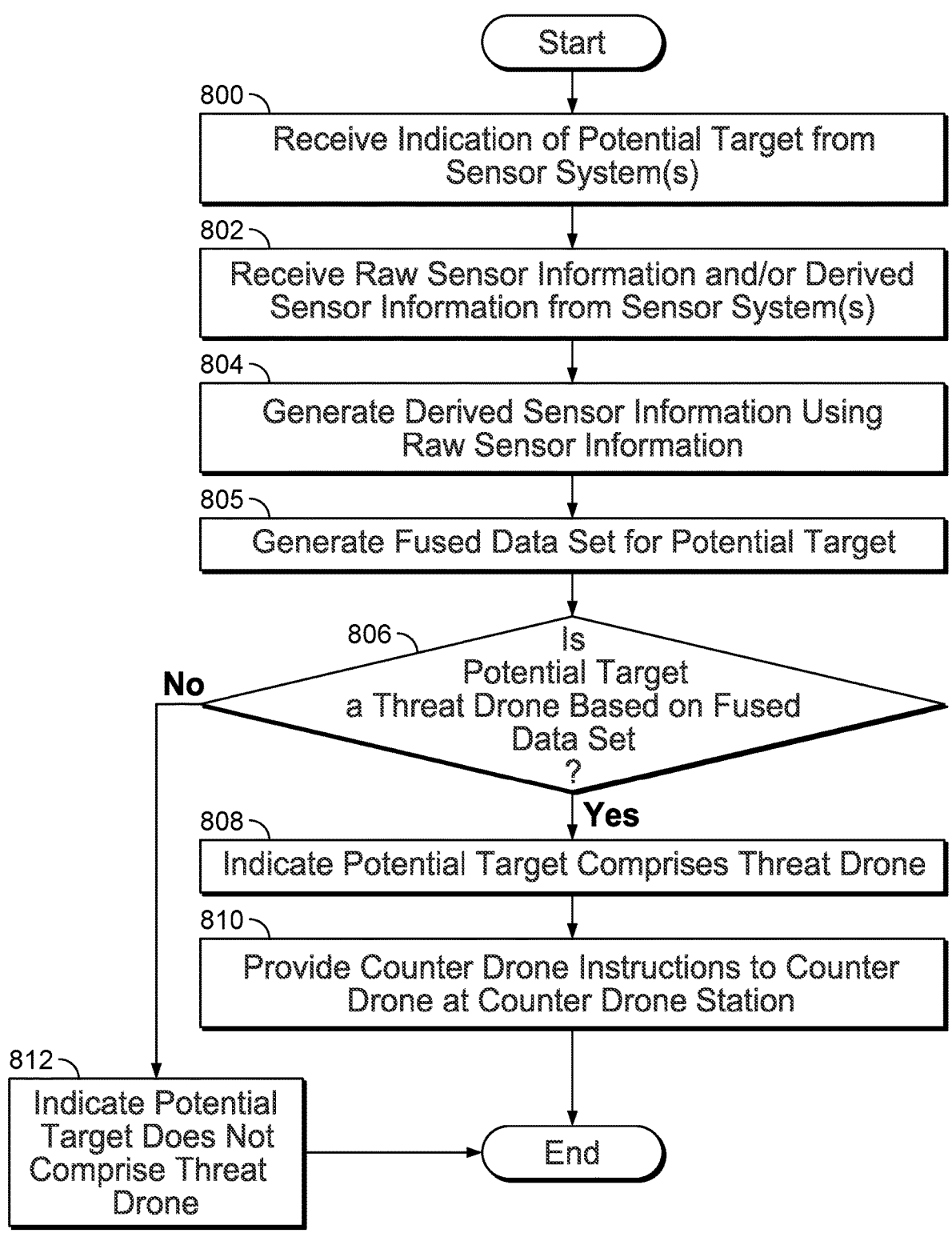
FIG. 8A is a flow diagram illustrating an embodiment of a process for determining whether a potential target comprises a threat drone, providing indication thereof, and providing instructions to a counter drone at a counter drone station.

FIG. 8A is a flow diagram illustrating an embodiment of a process for a counter drone system. In various embodiments, the process of FIG. 8A is executed using processor 108 of FIG. 1, using a processor of counter drone station 116 of FIG. 1, or using a processor of counter drone 112 of FIG. 1. In the example shown, the process of FIG. 8A is used by a counter drone system (e.g., the counter drone system of FIG. 1) to monitor for a potential target via a sensor station; determine whether the potential target comprises a threat drone; provide indication whether the potential target comprises the threat drone; and in response to determining that the potential target comprises the threat drone, provide counter drone instructions to a counter drone located at a counter drone station. In some embodiments, the process of FIG. 8A is used to provide counter drone instructions to one or more counter drones not located at a counter drone station. In various embodiments, the process of FIG. 8A is used to provide counter drone instructions directly to one or more counter drones (e.g., via a wireless network) and/or indirectly to one or more counter drones (e.g., via a network interface at one or more counter drone stations).

In the example shown, in 800, an indication of a potential target is received from sensor system(s), wherein the sensor system(s) comprises sensor(s). For example, an indication of a potential target is received by the server processor from sensor system(s). The sensor system(s) provide(s) raw sensor data and/or derived sensor information to a server processor to aid in determining whether the potential target comprises a threat drone. In various embodiments, an indication of a potential target comprises one or more of the following: an image profile, a vibration profile, a sound profile, an RF profile, a size information, a velocity information, an approach altitude, an approach direction, or any other appropriate raw sensor data and/or derived sensor information that is consistent with the type of potential targets for which the counter drone system is configured to monitor. In some embodiments, the sensor system(s) is/are configured to not provide an indication of a potential target to the server processor based on configurable criteria—for example, the potential target is outside of a physical zone (e.g., flying above a high-threshold altitude, flying farther than a threshold distance—for example, a high-flying jet would be moving too high), the potential target has measured characteristics outside of a threshold value (e.g., flying too fast—for example, a jet that is moving too fast to be considered a potential threat drone target), the potential target has a non-target profile (e.g., the potential target is emitting an RF immunity beacon, etc.). In some embodiments, the sensor system(s) is/are configured to provide an indication of a potential target based on any detected change in a baseline sensor parameter (e.g., a sound decibel level detected above a configured baseline decibel level; a sound frequency outside a configured baseline frequency band; an object with any velocity or approach direction, including a stationary object, detected by radar that does not exist in a configured baseline radar image; or any other change from one or more configured baseline sensor parameters). In some embodiments, an indication(s) is also received from a sensor (s) of a counter drone. In various embodiments, the sensors comprise one or more of the following: an RF sensor, a radar sensor, an IR sensor, an optical sensor, a lidar sensor, a laser vibrometer sensor, an audio sensor, an ultrasonic sensor, or any other appropriate sensor.

In 802, raw sensor information and/or derived sensor information is received from the sensor system(s). For example, the server receives raw sensor data and/or derived sensor information from a sensor system(s). In various embodiments, the raw sensor data comprises one or more of the following: a radio frequency data, a radar data, an infrared data, an optical data, a lidar data, a laser vibrometer data, an audio data, an ultrasonic data, or any other appropriate data. In various embodiments, derived sensor information comprises one or more of the following: an altitude, a position data, a location within a geo-fenced area, a target trajectory, a radar image, an infrared image, an optical image, a lidar image, a vibration profile, an RF profile, a sound profile, an absence or a presence of an RF immunity beacon, or any other appropriate derived information.

In 804, derived sensor information is generated using raw sensor information. For example, derived sensor information is generated by the server processor from the raw sensor data and derived sensor information received from the sensor system(s). In some embodiments, the processing of 804 is omitted and no derived sensor information is generated by the server processor.

In 805, fused data is generated for the potential target. For example, a processor for a server, a sensor system, a counter drone, a counter drone station determines a fused data set from received raw sensor information or derived sensor information. In some embodiments, the fused data set comprises the indication of the potential target and one or more of: another indication of the potential target, a raw sensor information, and/or a derived sensor information. In some embodiments, generating the fused data set comprises determining that the one or more of the another indication of the potential target, the raw sensor information, and/or the derived sensor information are associated with the potential target and combining the one or more of the another indication of the potential target, the raw sensor information, and/or the derived sensor information. In some embodiments, generating fused data is done autonomously.

In 806, it is determined whether the potential target comprises a threat drone based on the fused data set. For example, the server processor uses the received raw data and/or derived sensor information of a fused data set to determine whether the potential target is a threat drone based on an indication of the potential target, data from the sensors, and/or derived sensor information. In some embodiments, the presence of an RF immunity beacon is sufficient to determine that the potential target is not a threat drone. In some embodiments, determining whether the potential target comprises a threat drone based on the fused data set is done autonomously. In response to determining that the potential target does not comprise a threat drone, the control passes to 812. In 812, it is indicated that the potential target does not comprise a threat drone, and the process ends. For example, an indication is provided to the processor user that the potential target is not a threat drone.

In response to determining that the potential target comprises a threat drone in 806, control passes to 808. In 808, it is indicated that the potential target comprises a threat drone. In 810, counter drone instructions are provided to a counter drone at a counter drone station, and the process ends. In various embodiments, counter drone instructions comprise one or more of the following: a determined flight path, a velocity, an approach altitude, an approach direction, a launch time, a payload(s) to deploy upon threat drone interception, criteria for flight control of counter drone (e.g., whether flight control is based on local counter drone flight path determination and/or whether server based information is used for flight control of counter drone, or any other appropriate instructions. In various embodiments, a payload comprises one or more of the following: a kinetic payload, an explosive payload, a capture net, a signal marker, or any other appropriate payload. In some embodiments, providing counter drone instructions to a counter drone at a counter drone station is done autonomously.

Figure 8B:
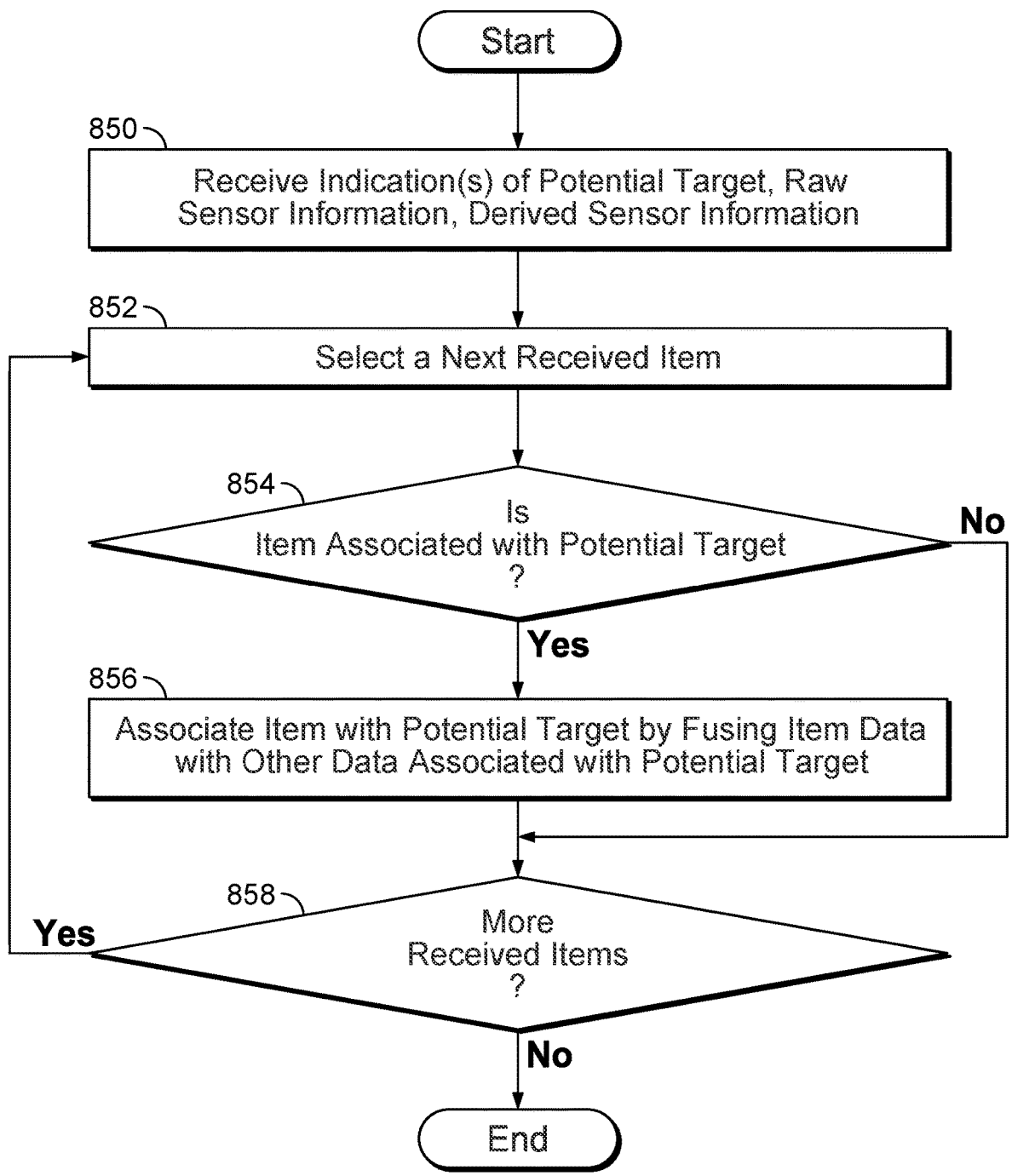
FIG. 8B is a process flow diagram illustrating an embodiment of a process for generating a fused data set.

FIG. 8B is a process flow diagram illustrating an embodiment of a process for generating a fused data set. In some embodiments, the process of FIG. 8B is used to implement 805 of FIG. 8A. In the example shown, in 850 indication(s) of potential target, raw sensor information, derived sensor information is received. In 852, select a received item. For example, the received item comprises one of the indications of the potential target, raw sensor information, and derived sensor information. In 854, it is determined whether the item is associated with the potential target. In response to determining that the item is associated with the potential target, in 856 associate the item with the potential target by fusing item data with other data associated with the potential target and control passes to 858, In response to determining that the item is not associated with the potential target, control passes to 858. In 858, it is determined whether there are more received items. In response to there being more received items, control passes to 852. In response to there not being more received items, the process ends.

Figure 9:
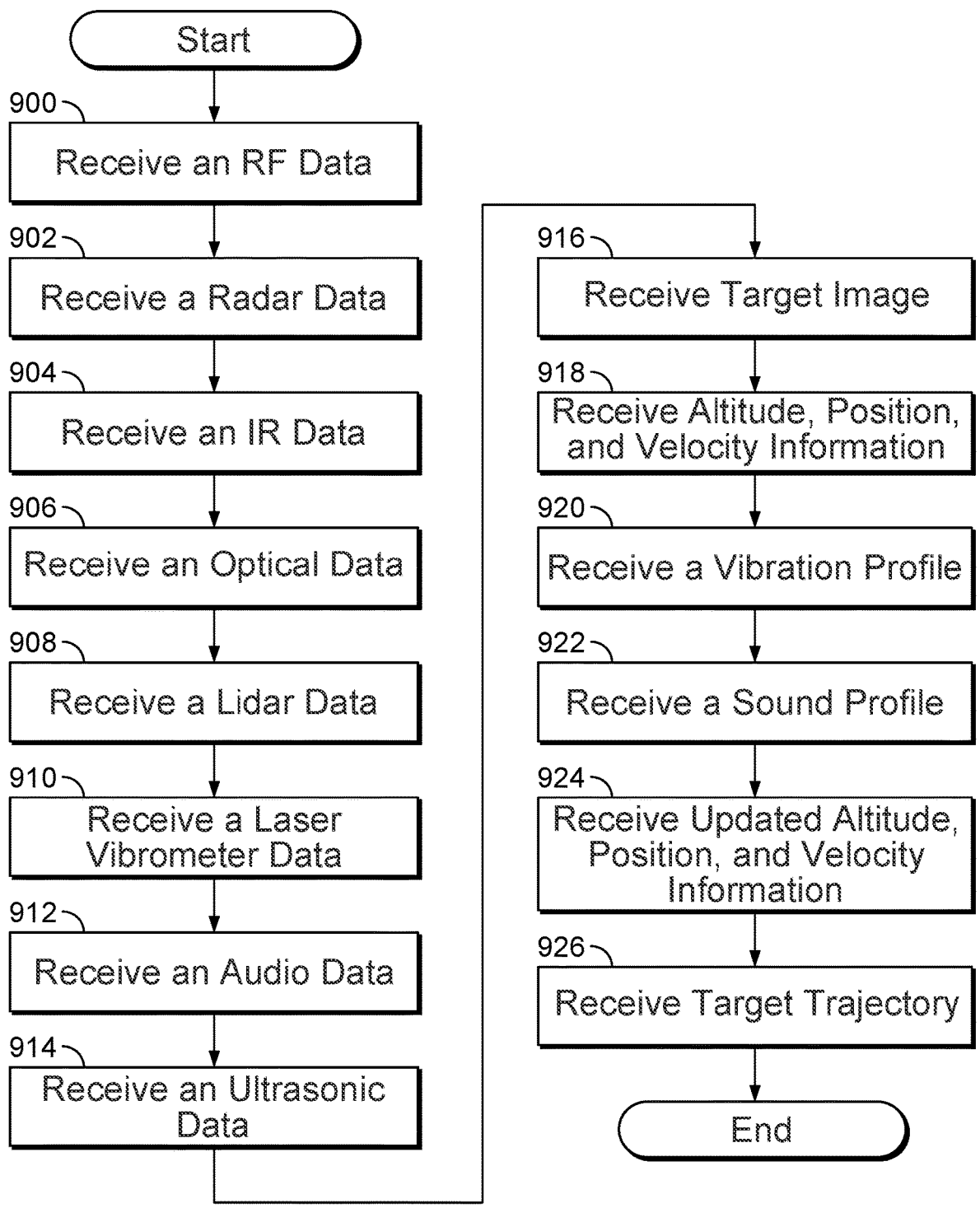
FIG. 9 is a flow diagram illustrating an embodiment of a process for receiving raw sensor data and derived sensor information from a sensor station.

FIG. 9 is a process flow diagram illustrating an embodiment of a process for receiving raw sensor data and derived sensor information from a sensor station. In some embodiments, the process of FIG. 9 is used to implement process 802 of FIG. 8A. In the example shown, multiple raw data (i.e., an RF data, a radar data, an IR data, an optical data, a lidar data, a laser vibrometer data, an audio data, and an ultrasonic data) are received from multiple sensor station sensors (i.e., an RF sensor, a radar sensor, an IR sensor, an optical sensor, a lidar sensor, a laser vibrometer sensor, an audio sensor, and an ultrasonic sensor) and multiple items of derived sensor information (i.e., a target image; an altitude, position, and velocity information; a vibration profile; a sound profile; an RF profile, an updated altitude, position, and velocity information, and a target trajectory) are received from the sensor station processor. At 900, an RF data is received. For example, a RF signature, spectrum, or profile is received. At 902, a radar data is received. At 904, an IR data is received. At 906, an optical data is received. At 908, a lidar data is received. At 910, a laser vibrometer data is received. At 912, an audio data is received. At 914, an ultrasonic data is received. At 916, a target image is received. At 918, altitude, position, and velocity information are received. At 920, a vibration profile is received. At 922, a sound profile is received. At 924, updated altitude, position, and velocity information are received. At 926, a target trajectory is received.

FIG. 10 is a flow diagram illustrating an embodiment of a process for generating derived sensor information using data. In various embodiments, the process of FIG. 10 is used to implement process 804 of FIG. 8A or to generate derived sensor data of 802 of FIG. 8A.

In the example shown, in 1000, a target image is generated using IR data, radar data, lidar data, and/or optical data. For example, raw data received from one or more sensors is used to generate an image (e.g., an optical image, a radar image, a lidar image, and/or an IR image) or a composite image (e.g., any combination of optical, radar, lidar, and IR images) of a potential target. In various embodiments, imaging radar techniques (e.g., synthetic aperture radar) and/or scanning or whole field lidar imaging techniques are used to generate 2-D and/or 3-D images of a potential target. In various embodiments, images of a potential target comprise still images or video images that include some portion, or all, of a potential target.

In 1002, altitude, position, and velocity information are generated using radar data, lidar data, and/or optical data. For example, altitude, position, and velocity information are generated using radar data (e.g., RF time of flight data); lidar data (e.g., laser light time of flight data); and/or optical data (e.g., estimated positions calculated using measurements from an optical image).

In 1004, a vibration profile is generated using laser vibrometer data. In some embodiments, a laser vibrometer sensor (e.g., a laser Doppler vibrometer) is used for long-distance detection of drone vibrations wherein the detected drone vibrations have a characteristic feature that can be identified by comparison to drone profiles in the drone profile database. In some embodiments, the characteristic feature of the detected drone vibrations is used to determine whether the drone is carrying a payload (e.g., a drone carrying a payload has a different vibration profile than one that is not loaded).

In 1006, a sound profile is generated using audio and/or ultrasonic data. For example, audio and/or ultrasonic data are used to produce a sound profile using audible sound waves (e.g., 20 Hz to 20,000 Hz) and/or ultrasonic sound waves (e.g., 20 kHz to 200 kHz) generated by or reflected from the potential target and as received by an audio sensor (e.g., a parabolic microphone).

In 1008, updated altitude, position, and velocity information are generated using radar data, lidar data, and/or optical data. For example, updated altitude, position, and velocity information are continuously generated; updated at regular intervals (e.g. once every second, once every 2 seconds, etc.); or updated at any other convenient interval or set of selected time points to allow process 1008 to generate a target trajectory. In 1010, a target trajectory is generated based on updated altitude, position, and velocity information. For example, the target trajectory indicates potential future positions at times in the future based on the past positions and times for the potential target. In some embodiments, because drone flight paths are not necessarily direct and linear, a probabilistic map is generated for likely positions at future times.

FIG. 11 is a flow diagram illustrating an embodiment of a process for determining whether a potential target comprises a threat drone and providing indication thereof. In some embodiments, the process of FIG. 11 is used to implement process 806 of FIG. 8A.

In 1100, it is determined whether detected RF data comprises an immunity beacon. In response to an immunity beacon being detected, the control passes to 1102. In 1102, it is indicated that the potential target is not a threat drone and the process begins again.

In response to an immunity beacon not being detected, the control passes to 1104. In 1104, it is determined whether a characteristic of the potential target exists within a range. For example, characteristics of the potential target comprise size, altitude, velocity and/or acceleration, etc. In some embodiments, potential target characteristics are configurable by the administrator of the system (e.g., based on the type of threat drones that the disclosed counter drone system is desired or capable of destroying, disabling, or capturing).

In some embodiments, the size of the potential target is determined to fall within a range (e.g., the potential target is larger than a minimum size but is smaller than a maximum size). In some embodiments, the altitude of the potential target is determined to fall within a range (e.g. the potential target has an altitude greater than a minimum altitude, but less than a maximum altitude). In some embodiments, the velocity of the potential target is determined to fall within a range (e.g. the potential target has a velocity greater than zero, but less than a maximum velocity). In some embodiments, the acceleration of the potential target is determined to fall within a range (e.g. the potential target has an acceleration greater than zero, but less than a maximum acceleration).

In 1104, in response to a characteristic of the potential target existing within a configured range (e.g., as configured by the administrator of the system) the control passes to 1106; in response to a characteristic of the potential target existing outside the configured range, the control passes back to 1102.

In 1106, it is determined whether the potential target is within a geo-fenced area. In response to the potential target not being within a geo-fenced area, the control passes to 1108. In 1108, it is determined whether the potential target has a trajectory that will take it within geo-fenced area. In response to the potential target having a trajectory that will not take it within geo-fenced area, the control passes back to 1102.

In response to the potential target being within a geo-fenced area, or has a trajectory that will take it within geo-fenced area, the control passes in parallel to 1110, 1112, and 1114.

In 1110, the probability that the potential target image matches a threat drone image is determined. In 1112, the probability that the potential target sound profile matches a threat drone sound profile is determined. In 1114, the probability that the potential target vibration profile matches a threat drone profile is determined. The probabilities from 1110, 1112, and 1114 pass to 1116. In some embodiments, in addition to or instead of 1110, 1112, or 1114, the probability that the potential target RF profile matches a threat drone RF profile is determined. In 1116, based on the cumulative threat profile probabilities, it is determined whether the potential target comprises a threat drone. For example, a weighted average of the probabilities from 1110, 1112, and 1114 is used to generate a cumulative probability, wherein the probability weightings are configurable by an administrator of the system, and compared to a threshold probability level (e.g., 70% probability, 80% probability, etc.). If the cumulative probability level does not exceed the threshold probability level, control passes back to 1102. If the cumulative probability level exceeds the threshold probability level, control passes to 1118. In 1118, it is indicated that the potential target comprises a threat drone and the process ends.

In some embodiments, for example during a wartime engagement, the counter drone system is configured to determine a threat drone if an indicated potential target matches a drone profile of any type. In some embodiments, the counter drone system is configured to determine a threat drone if a potential target is above an altitude threshold, is within a geofenced area, and matches a drone profile of any type.

In some embodiments, a database is used to compare received target profiles (e.g., an image profile, a vibration profile, or a sound profile) against stored drone profiles. In some embodiments, the drone profile database is updated to include drone and threat drone profiles not previously stored in the drone profile database.

An example of an indicated potential target that may require one or more evaluations to determine that it is not a threat drone is a bird. The bird may show up on the sensors above a threshold altitude level, within a geo-fenced area, and/or having a trajectory that will take it within a radius of a geofenced area. However, it will require the processing of its image profile, vibration profile, an RF profile, sound profile, and/or other threat drone characteristics to determine that it is not a threat.

An indicated potential target that is not a counter drone, but has been identified as a drone, may require one or more evaluations to determine that it is not a threat drone (i.e., a non-threat drone)—for example, a camera drone of a regional TV station or a police surveillance drone. In some embodiments, the drone profile of a non-threat drone is stored in the drone profile database. In some embodiments, an RF immunity beacon is used by a non-threat drone, wherein the RF immunity beacon signature is stored in the drone profile database. In some embodiments, the RF immunity beacon of the non-threat drone uses a different RF signature that those of the counter drones of the disclosed counter drone system.

As a counter example, a potential target that matches a known or suspected threat drone image profile, vibration profile, an RF profile, sound profile, and/or other threat drone characteristics would not be considered a threat drone (i.e., an actionable threat) if it is outside the geofenced area, does not have a trajectory that will take it within a radius of a geofenced area, and/or if it is not above a threshold altitude level (e.g., it is on the ground, or below an altitude where it would be stopped by a fence or other physical barrier that would not require activation of the counter drone system).

FIG. 12 is a flow diagram illustrating an embodiment of a process for intercepting a threat drone. In some embodiments, the process of FIG. 12 is used to implement process 810 of FIG. 8A.

In 1200, the payload type is determined based on the strategy for addressing the threat. For example, for a destruction of a threat drone strategy a kinetic payload and/or an explosive payload is used whereas for a capture of a threat drone strategy a net/hook/harpoon payload is used. Payload types comprise a kinetic payload, an explosive payload, a capture net or other capture payload, and/or a signal marker. In some embodiments, the strategy is configured by the administrator of the system. In some embodiments, the configuration of the response strategy is based on parameters—for example, one or more of the following: a protected area's characteristics (e.g., a location near public areas, a location near military areas, a location near traffic corridors, etc.), a level of desired protection for the protected area (e.g., critical, expendable, etc.), a state of activity near the protected area (e.g., a war zone, a border area, a civilian area, etc.), or any other appropriate parameters.

In some embodiments, during a wartime engagement, the counter drone system is configured to provide counter drone instructions to destroy an indicated threat drone in the event that an indicated potential target matches a drone profile of any type. In various embodiments, instructions to destroy an indicated threat drone comprise deploying one or more kinetic and/or explosive payloads. In some embodiments, the response strategy is configured to destroy an indicated threat drone only when the indicated threat drone moves outside of a protected area.

In some embodiments, the response strategy is configured to disable an indicated threat drone (e.g., when inside a protected area). In various embodiments, instructions to disable an indicated threat drone comprise deploying one or more capture payloads and/or kinetic payloads. In some embodiments, instructions to capture an indicated threat drone comprise deploying one or more capture payloads to acquire the threat drone and transport it to a configured location (e.g., a counter drone station).

In various embodiments, the response strategy is configured to deploy one or more signal markers to indicate the location of counter drone interception of the threat drone, and/or the success of threat drone destruction or disablement.

In some embodiments, any aspect of the counter drone system strategy or configuration can be updated in real time by one or more users of the counter drone system.

In 1202, counter drone candidates are determined based on the payload type. For example, of the available counter drones, only some may be equipped with the desired payload type(s) for a given response strategy. Counter drones equipped with the desired payload type(s) are determined to be counter drone candidates.

In 1204, flight paths are determined for the counter drone candidates. For example, flight paths to intercept the threat drone are determined based on configured instructions by administrator of the system. In some embodiments, one or more geo-fenced areas are used for defining operational zones each with different administrative guidelines. For example, a geo-fenced 'safety zone' in or around protected asset(s) stipulates instructions for the counter drone system not to use a flight path that takes the counter drone within the safety zone. In some embodiments, flight paths are configured to avoid detection by attacking forces—for example, by flying below a specified altitude; by avoiding areas that are monitored or protected by attacking forces; and/or by taking advantage of local physical features to avoid detection as long as possible (e.g., a mountain, a wall, a building, etc.).

In 1206, the probability of threat drone interception for each counter drone candidate is determined based on the determined flight paths and strategy. For example, the probability of threat drone interception is calculated based on least time to intercept. In some embodiments, the probability of threat drone interception is calculated based on the path most likely to avoid detection. In various embodiments, the probability of threat drone interception is calculated based on the type and/or size of the threat drone, the defense mechanisms of the threat drone, and/or available or learned history (e.g. via automated learning algorithms used by the server processor) regarding the successful destruction, disablement, and/or capture of the identified threat drone using the one or more selected counter drone candidates and respective payload(s). In various embodiments, the probability of threat drone interception is calculated based on a cumulative probability that considers one or more probabilities (e.g., time to intercept, detection avoidance, successful intercept history, etc.) or any other appropriate information to facilitate operation of the counter drone system. For example, a weighted average of the probabilities is used to generate a cumulative probability, wherein the probability weightings are configurable by an administrator of the system, and compared to a threshold probability level (e.g., 70% probability, 80% probability, etc.).

In 1208, it is determined which drone(s) from the counter drone candidates will receive intercept instructions based on the ranked probability of intercept. In some embodiments, when no single counter drone is ranked above the configured threshold probability level, the probability of achieving a successful threat drone intercept is increased above the configured threshold probability level by using more than one counter drone candidate.

In 1210, instructions are provided to the selected intercept drone(s). In some embodiments, instructions are provided to the selected intercept drone(s) via wireless communication with the server.

In 1212, progress of the selected intercept drone(s) is determined. In some embodiments, one or more sensor stations monitor progress of the selected intercept drone using one or more of the available sensor station sensors (e.g., an RF sensor, a radar sensor, an IR sensor, an optical sensor, an audio sensor, etc.). In some embodiments, a successful intercept is indicated by one or more intercept counter drones deploying a signal maker (e.g., an RF signal, a visual signal, an audio signal, etc.)

In 1214, it is determined if the objective has been met or whether new instructions are required. In response to determining that the objective has been met, the process moves to 1216. In 1216, it is indicated that the objective has been met or that new instructions are required and the process moves to 1218. In 1218, finishing instructions or new instructions are provided to the intercept drone(s), and the process ends. For example, the drone station landing assignments are determined for the counter drone(s) based on battery status of the drone(s) and the desired distribution of appropriate payload types at drone stations as well as slot availability at a given drone station. In some embodiments, it is determined when there is a time for redistributing drones for the drone stations and drone(s) are distributed to appropriate drone stations to balance payload types, drone types, or any other appropriate characteristics. In some embodiments, no finishing instructions are provided to the intercept drone (e.g. the intercept drone(s) is no longer functional).

In response to determining that the objective has not been met, the process moves to 1220. In 1220, it is determined whether to continue with the current strategy. In response to determining to continue with the current strategy, the process moves back to 1204. In response to determining not to continue with the current strategy, the process moves to 1222, a new strategy is provided, and the process moves back to 1200.

FIG. 13 is a flow diagram illustrating an embodiment of a process for instructing a drone flight controller. In some embodiments, the process of FIG. 13 is used to provide instructions to a drone flight controller (e.g., flight controller 616 of FIG. 6). In some embodiments, the instructions to a drone flight controller are used in the process of pursuing the intercept instructions provided to selected drone(s). In the example shown, in 1300 a server threat drone location and/or flight path information is received, if available. For example, a drone that is intercepting a threat drone is provided with intercept instructions. The intercept instructions include information to determine guidance handoff criteria as to when the drone that is intercepting the threat drone uses server provided information or locally determined information for instructing its flight controller. In 1302, threat drone location and/or flight path information is determined locally. For example, the drone processes local sensor information to determine threat drone location and/or flight path information to fulfill its intercept mission. In some embodiments, prior threat drone location information and/or flight path information is used that came from a server based on other sensors (e.g., other drone sensors, sensor station sensors, etc.) as well as aggregations of data from the other sensors. In 1304, it is determined whether to use the server or local threat drone location and/or flight path information. In response to determining to use server information, control passes to 1306. In 1306, drone controller is instructed using a server flight path or a determined flight path based on a server provided threat drone location, and control passes to 1310. For example, the server is used as the source of information used to determine a drone flight path. The server can aggregate information from many sensor stations as well as many drones potentially making the information more accurate. In response to determining to use local information, control passes to 1308. In 1308, drone controller is instructed using a locally determined server flight path, and control passes to 1310. For example, the local drone processor uses drone sensors as the source of information to determine its own flight path. The drone can process sensor information from local sensors rapidly potentially making the information more timely with very low latency. This means that the response time in pursuit of a threat drone will be the shortest possible. In 1310, it is determined whether there is more location/flight path information. In response to determining that there is more location/flight path information, control passes to 1300. In response of determining that there is not more location/flight path information, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for countering a threat drone, comprising:
a plurality of sensor systems, wherein a sensor system of the plurality of sensor systems comprises one or more sensors that are connected to a network;
a counter drone, wherein the counter drone is connected to the network; and
a processor configured to:
receive an indication of a potential target from the plurality of sensor systems;
generate a fused data set of the potential target, wherein the fused data set comprises the indication of the potential target and one or more of: another indication of the potential target, a raw sensor information, and/or a derived sensor information, wherein generating the fused data set comprises determining that the one or more of the another indication of the potential target, the raw sensor information, and/or the derived sensor information are all associated with the potential target and combining the one or more of the another indication of the potential target, the raw sensor information, and/or the derived sensor information, wherein the derived sensor, information is generated using the raw sensor information, and wherein the derived sensor information comprises an altitude, a position data, a location within a geofenced area, a target trajectory, a radar image, an infrared image, an optical image, a lidar image, a vibration profile, an RF profile, a sound profile, and/or an absence or a presence of an RF immunity beacon;
determine that the potential target does not comprise the threat drone based at least in part on the fused data set, comprising to:
determine that a characteristic of the potential target is not within a geofenced area; and
in response to determining that the characteristic of the potential target is not within the geofenced area:
determine that a trajectory of the potential target will take the potential target within the geofenced area; and
in response to determining that the trajectory of the potential target will take the potential target within the geofenced area:

determine a first probability that a potential target image matches a threat drone image, a second probability that a potential target vibration profile matches a threat drone vibration profile. and a third probability that a potential target sound profile matches a threat drone sound profile;

determine a combined probability based on a combination of the first probability, the second probability, and the third probability;

determine whether the combined probability is equal to or exceeds a threshold; and in response to determining that the combined probability is less than the threshold, determine that the potential target does not comprise the threat drone; and in response to determining that the potential target comprises does not comprise the threat drone, provide omit providing counter drone instructions to the counter drone.

2. The system of claim 1, wherein the sensor system of the plurality of sensor systems comprises a sensor tower sensor system, a vehicle mounted sensor system, a counter drone mounted sensor system, a human mounted sensor system, a telephone pole sensor system, or a building sensor system.

3. The system of claim 1, wherein the counter drone instructions control the counter drone, wherein the counter drone is configured to be launched or propelled toward the threat drone.

4. The system of claim 2, wherein the counter drone performs terminal guidance intended to intercept the threat drone.

5. The system of claim 1, wherein the processor comprises a sensor system processor or a counter-drone processor.

6. The system of claim 1, wherein one sensor system of the plurality of sensor systems communicates with the processor using a mesh network.

7. The system of claim 1, wherein the counter drone communicates with the processor using a mesh network.

8. The system of claim 1, wherein the indication of the potential target comprises the raw sensor information.

9. The system of claim 1, wherein the raw sensor information comprises one or more of: a radio frequency data, a radar data, an infrared data, an optical data, a lidar data, a vibrometer data, an audio data, and/or an ultrasonic data.

10. The system of claim 1, wherein the derived sensor information is generated using the raw sensor information.

11. The system of claim 10, wherein the sensor system generates the derived sensor information.

12. The system of claim 10, wherein the processor generates the derived sensor information.

13. The system of claim 1, wherein determining that the potential target comprises the threat drone further includes determining that a second characteristic of the potential target is within a range, wherein the second characteristic comprises size, altitude, velocity, acceleration, or any combination thereof.

14. The system of claim 1, wherein determining that the potential target comprises the threat drone includes determining that the potential target is within the geofenced area.

15. The system of claim 1, wherein determining that the potential target comprises the threat drone includes determining that the trajectory of the potential target will take the potential target within a radius of the geofenced area.

16. The system of claim 1, determining that the potential target comprises the threat drone includes determining that the potential target image matches a threat drone image profile in a threat drone database, wherein the potential target image comprises the optical image, the radar image, the lidar image, or the infrared image.

17. The system of claim 1, wherein determining that the potential target comprises the threat drone further includes determining that the potential target vibration profile matches the threat drone vibration profile in a threat drone database, wherein the vibration profile comprises laser vibrometer data.

18. The system of claim 1, wherein determining that the potential target comprises the threat drone includes determining that a potential target RF profile matches a threat drone RF profile in a threat drone database, wherein the RF profile comprises RF data.

19. The system of claim 1, wherein determining that the potential target comprises the threat drone includes determining that the potential target sound profile matches the threat drone sound profile in a threat drone database.

20. The system of claim 1, wherein a counter drone instruction of the counter drone instructions comprises a counter drone standby instruction, a destroy instruction, a disable instruction, and/or a capture the threat drone instruction.

21. The system of claim 1, wherein the counter drone is equipped with one or more payloads, wherein a payload of the one or more payloads comprises a kinetic payload, an explosive payload, a capture net, or a signal marker.

22. A method for countering a threat drone, comprising:
receiving an indication of a potential target from a plurality of sensor systems, wherein a sensor system of the plurality of sensor systems comprises one or more sensors that are connected to a network;

generating a fused data set for the potential target, wherein the fused data set comprises the indication of the potential target and one or more of: another indication of the potential target, a raw sensor information, and/or a derived sensor information, wherein generating the fused data set comprises determining that the one or more of the another indication of the potential target, the raw sensor information, and/or the derived sensor information are all associated with the potential target and combining the one or more of the another indication of the potential target, the raw sensor information, and/or the derived sensor information, wherein the derived sensor, information is generated using the raw sensor information, and wherein the derived sensor information comprises an altitude, a position data, a location within a geo-fenced area, a target trajectory, a radar image, an infrared image, an optical image, a lidar image, a vibration profile, an RF profile, a sound profile, and/or an absence or a presence of an RF immunity beacon;

determining, using a processor, that the potential target does not comprise the threat drone based at least in part on the fused data set, comprising:
determining that a characteristic of the potential target is not within a geofenced area; and
in response to determining that the characteristic of the potential target is not within the geofenced area:
determining that a trajectory of the potential target will take the potential target within the geofenced area; and
in response to determining that the trajectory of the potential target will take the potential target within the geofenced area:
determining a first probability that a potential target image matches a threat drone image, a second probability that a potential target vibration profile matches a threat drone vibration profile, and a third probability that a potential target sound profile matches a threat drone sound profile;

determining a combined probability based on a combination of the first probability, the second probability, and the third probability;

determining whether the combined probability is equal to or exceeds a threshold; and in response to determining that the combined probability is less than the threshold, determining that the potential target does not comprise the threat drone; and in response determining that the potential target does not comprise the threat drone, omitting to provide counter drone instructions to a counter drone, wherein the counter drone is connected to the network.

23. A computer program product for countering a threat drone, the computer program product being embodied in a non-transitory computer readable storage medium and comprising computer instructions for:

receiving an indication of a potential target from a plurality of sensor systems, wherein a sensor system of the plurality of sensor systems comprises one or more sensors that are connected to a network;

generating a fused data set for the potential target, wherein the fused data set comprises the indication of the potential target and one or more of: another indication of the potential target, a raw sensor information, and/or a derived sensor information, wherein generating the fused data set comprises determining that the one or more of the another indication of the potential target, the raw sensor information, and/or the derived sensor information are all associated with the potential target and combining the one or more of the another indication of the potential target, the raw sensor information, and/or the derived sensor information, wherein the derived sensor, information is generated using the raw sensor information, and wherein the derived sensor information comprises an altitude, a position data, a location within a geo-fenced area, a target trajectory, a radar image, an infrared image, an optical image, a lidar image, a vibration profile, an RF profile, a sound profile, and/or an absence or a presence of an RF immunity beacon;

determining, using a processor, that the potential target does not comprise the threat drone based at least in part on the fused data set; data set, comprising:

determining that a characteristic of the potential target is not within a geofenced area; and in response to determining that the characteristic of the potential target is not within the geofenced area:

determining that a trajectory of the potential target will take the potential target within the geofenced area; and in response to determining that the trajectory of the potential target will take the potential target within the geofenced area:

determining a first probability that a potential target image matches a threat drone image, a second probability that a potential target vibration profile matches a threat drone vibration profile, and a third probability that a potential target sound profile matches a threat drone sound profile;

determining a combined probability based on a combination of the first probability, the second probability, and the third probability;

determining whether the combined probability is equal to or exceeds a threshold; and in response to determining that the combined probability is less than the threshold, determining that the potential target does not comprise the threat drone; and in response to determining that the potential target does not comprise the threat drone, omitting to provide counter drone instructions to a counter drone, wherein the counter drone is connected to the network.

* * * * *

UNITED STATES PATENT AND TRADEMARK OFFICE
CERTIFICATE OF CORRECTION

PATENT NO. : 12,282,340 B2
APPLICATION NO. : 18/404684
DATED : April 22, 2025
INVENTOR(S) : Jason Levin et al.

Page 1 of 1

It is certified that error appears in the above-identified patent and that said Letters Patent is hereby corrected as shown below:

In the Claims

In Column 22, Claim 1, Line 45, delete "derived sensor, information" and insert --derived sensor information--.

In Column 23, Claim 1, Line 5, delete "vibration profile. and" and insert --vibration profile, and--.

In Column 23, Claim 1, Lines 17-18, delete "potential target comprises does" and insert --potential target does--.

In Column 23, Claim 1, Lines 18-19, delete "drone, provide omit providing" and insert --drone, omit providing--.

In Column 24, Claim 22, Line 45, delete "derived sensor, information" and insert --derived sensor information--.

In Column 25, Claim 22, Line 15 (Approx.), delete "in response determining" and insert --in response to determining--.

In Column 25, Claim 23, Line 39, delete "derived sensor, information" and insert --derived sensor information--.

In Column 26, Claim 23, Line 9 (Approx.), delete "fused data set; data set, comprising:" and insert --fused data set, comprising:--.

Signed and Sealed this
Fourteenth Day of October, 2025

John A. Squires
*Director of the United States Patent and Trademark Office*